US012334019B2

(12) United States Patent
Chung et al.

(10) Patent No.: US 12,334,019 B2
(45) Date of Patent: Jun. 17, 2025

(54) PIXEL AND DISPLAY DEVICE INCLUDING THE SAME

(71) Applicant: Samsung Display Co., LTD., Yongin-si (KR)

(72) Inventors: Jinkoo Chung, Yongin-si (KR); Seong-Min Kim, Yongin-si (KR); Beohmrock Choi, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/230,956

(22) Filed: Aug. 7, 2023

(65) Prior Publication Data

US 2024/0127755 A1 Apr. 18, 2024

(30) Foreign Application Priority Data

Oct. 17, 2022 (KR) ........................ 10-2022-0133533

(51) Int. Cl.

*G09G 3/3258* (2016.01)
*G09G 3/20* (2006.01)
*G09G 3/3266* (2016.01)

(52) U.S. Cl.

CPC ......... *G09G 3/3258* (2013.01); *G09G 3/2003* (2013.01); *G09G 3/3266* (2013.01)

(58) Field of Classification Search

CPC .. G09G 3/3258; G09G 3/2003; G09G 3/3266; G09G 3/32; G09G 3/3233; G09G 2300/023; G09G 2300/0426; G09G 2300/0443; G09G 2300/0452; G09G 2300/0809; G09G 2320/028; G09G 2358/00; H10K 50/85; H10K 59/1213; H10K 59/131

See application file for complete search history.

(56) References Cited

U.S. PATENT DOCUMENTS

| | | | | |
|---|---|---|---|---|
| 11,011,724 | B2 | 5/2021 | Lim et al. | |
| 11,075,364 | B2 | 7/2021 | Kim et al. | |
| 11,079,645 | B2 | 8/2021 | Harrold et al. | |
| 11,200,855 | B2 | 12/2021 | Fattal | |
| 2012/0133682 | A1* | 5/2012 | Kawano | G09G 3/3233 345/690 |
| 2012/0299883 | A1* | 11/2012 | Sumida | H10K 59/876 345/204 |
| 2015/0319813 | A1* | 11/2015 | Khachatryan | H10K 50/844 313/504 |
| 2017/0162632 | A1* | 6/2017 | Kim | H10K 59/38 |
| 2018/0231826 | A1* | 8/2018 | Oh | G02F 1/133504 |

(Continued)

FOREIGN PATENT DOCUMENTS

| | | | |
|---|---|---|---|
| KR | 1020200001694 | A | 1/2020 |
| KR | 1020200063591 | A | 6/2020 |
| KR | 1020210121933 | A | 10/2021 |

*Primary Examiner* — David Tung

(74) *Attorney, Agent, or Firm* — CANTOR COLBURN LLP

(57) ABSTRACT

A display device includes a pixel driving circuit, a first-type light-emitting element electrically connected to the pixel driving circuit, a second-type light-emitting element electrically connected to the pixel driving circuit, and a light path control layer disposed to overlap the second-type light-emitting element, where the light path control layer controls a path of light provided from the second-type light-emitting element.

22 Claims, 26 Drawing Sheets

(56) References Cited

U.S. PATENT DOCUMENTS

| | | | | |
|---|---|---|---|---|
| 2020/0020885 | A1* | 1/2020 | Lee | H10K 59/875 |
| 2020/0168844 | A1* | 5/2020 | Kim | H10K 59/12 |
| 2022/0306012 | A1* | 9/2022 | Kim | B60R 11/0235 |
| 2023/0100284 | A1* | 3/2023 | Yao | G09G 3/20<br>345/55 |
| 2023/0217794 | A1* | 7/2023 | Kim | H10K 59/50<br>349/33 |

* cited by examiner

PIXEL AND DISPLAY DEVICE INCLUDING THE SAME

This application claims priority to Korean Patent Application No. 10-2022-0133533, filed on Oct. 17, 2022, and all the benefits accruing therefrom under 35 U.S.C. § 119, the content of which in its entirety is herein incorporated by reference.

BACKGROUND

1. Field

The disclosure herein relates to a pixel configured to provide various modes and a display device including the pixel.

2. Description of the Related Art

Display devices used in various devices such as televisions, mobile phones, tablets, and vehicles are being developed. In accordance with the regulations for safety or use environments to protect information, the limitation of a viewing angle of a display device may be desired. Therefore, research is being conducted to limit the viewing angle thereof.

SUMMARY

The disclosure provides a pixel configured to operate in various modes.

The present also provides a display device configured to provide images of different viewing angles.

An embodiment of the invention provides a display device including: a pixel driving circuit; a first-type light-emitting element electrically connected to the pixel driving circuit; a second-type light-emitting element electrically connected to the pixel driving circuit; and a light path control layer disposed to overlap the second-type light-emitting element, where the light path control layer controls a path of light provided from the second-type light-emitting element.

In an embodiment, a color of light provided from the first-type light-emitting element may be substantially the same as a color of light provided from the second-type light-emitting element.

In an embodiment, the display device may further include a data line, a plurality of scan lines, a plurality of light-emitting control lines, and a plurality of voltage lines, which are electrically connected to the pixel driving circuit, where the pixel driving circuit may include: a driving transistor including a first electrode, a second electrode, and a gate electrode; a switching transistor connected between the first electrode of the driving transistor and the data line; a first light-emitting control transistor connected between the second electrode of the driving transistor and the first-type light-emitting element; and a second light-emitting control transistor connected between the second electrode of the driving transistor and the second-type light-emitting element.

In an embodiment, the plurality of voltage lines may include an initialization voltage line to which an initialization voltage is applied, and the pixel driving circuit may further include: a first initialization transistor connected between the initialization voltage line and a first node between the first light-emitting control transistor and the first-type light-emitting element; and a second initialization transistor connected between the initialization voltage line and a second node between the second light-emitting control transistor and the second-type light-emitting element.

In an embodiment, the plurality of voltage lines may include a first driving voltage line to which a first driving voltage is applied and a second driving voltage line to which a second driving voltage different from the first driving voltage is applied; the first-type light-emitting element and the second-type light-emitting element may be connected to the second driving voltage line; and the pixel driving circuit may further include a third light-emitting control transistor connected between the first driving voltage line and the first electrode of the driving transistor.

In an embodiment, the plurality of light-emitting control lines may include: a first light-emitting control line connected to a gate electrode of the first light-emitting control transistor; a second light-emitting control line connected to a gate electrode of the second light-emitting control transistor, where a signal applied to the second light-emitting control line may be different from a signal provided to the first light-emitting control line; and a third light-emitting control line connected to a gate electrode of the third light-emitting control transistor, where a signal applied to the third light-emitting control line may be different from both the signal applied to the first light-emitting control line and the signal applied to the second light-emitting control line.

In an embodiment, the pixel driving circuit may further include a fourth light-emitting control transistor connected between the first driving voltage line and the first electrode of the driving transistor.

In an embodiment, the plurality of light-emitting control lines may include: a first light-emitting control line connected to a gate electrode of the first light-emitting control transistor and a gate electrode of the third light-emitting control transistor; and a second light-emitting control line connected to a gate electrode of the second light-emitting control transistor and a gate electrode of the fourth light-emitting control transistor, where a signal applied to the second light-emitting control line may be different from a signal applied to the first light-emitting control line.

In an embodiment, the pixel driving circuit may selectively operate in one of a first mode and a second mode, where, in the second mode, the first-type light-emitting element may not emit light and the second-type light-emitting element may emit light.

In an embodiment, in the first mode, the first-type light-emitting element and the second-type light-emitting element may alternately emit light in a time-division manner.

In an embodiment, in the first mode, the second-type light-emitting element may not emit light, and the first-type light-emitting element may emit light.

In an embodiment, in the first mode, the first-type light-emitting element and the second-type light-emitting element may simultaneously emit light.

In an embodiment, a first light-emitting region may be defined in the first-type light-emitting element, a second light-emitting region may be defined in the second-type light-emitting element, and the light path control layer may include a plurality of barrier ribs overlapping the second light-emitting region and a transmission portion between the plurality of barrier ribs.

In an embodiment, the plurality of barrier ribs may include a light absorbing material.

In an embodiment, each of the plurality of barrier ribs may include a low-reflection layer having a reflectance of less than about 10 percent.

In an embodiment, the light path control layer may be provided in plural, and a plurality of light path control layers may be sequentially stacked in a direction away from the first-type light-emitting element and second-type light-emitting element.

In an embodiment, each of the plurality of barrier ribs may extend in a first direction, and a width of the second light-emitting region in the first direction may be less than a length of each of the plurality of barrier ribs in the first direction.

In an embodiment of the invention, a display device includes: a display panel including a plurality of pixel units; and a light path control layer disposed on the display panel and including a plurality of barrier ribs which controls a path of light provided from the display panel. In such an embodiment, each of the plurality of pixel units may include: X (a positive integer) light-emitting elements; and Y (a positive integer less than X) pixel driving circuits which drive the X light-emitting elements, where the X light-emitting elements include: a plurality of first-type light-emitting elements not overlapping the plurality of barrier ribs; and a plurality of second-type light-emitting elements overlapping the plurality of barrier ribs.

In an embodiment, the plurality of first-type light-emitting elements may include a first first-type light-emitting element, a second first-type light-emitting element, and a third first-type light-emitting element, and the plurality of second-type light-emitting elements may include a first second-type light-emitting element, a second second-type light-emitting element, and a third second-type light-emitting element, where: a color of light provided from the first first-type light-emitting element may be substantially the same as a color of light provided from the first second-type light-emitting element; a color of light provided from the second first-type light-emitting element may be substantially the same as a color of light provided from the second second-type light-emitting element; and a color of light provided from the third first-type light-emitting element may be substantially the same as a color of light provided from the third second-type light-emitting element.

In an embodiment, the plurality of pixel units may be repeatedly arranged along a first direction and a second direction crossing the first direction; the first second-type light-emitting element, the first first-type light-emitting element, the second second-type light-emitting element, and the second first-type light-emitting element may be arranged along the first direction; and the third second-type light-emitting element and the third first-type light-emitting element may be arranged along the first direction, where the third second-type light-emitting element and the third first-type light-emitting element may be spaced apart from the first second-type light-emitting element, the first first-type light-emitting element, the second second-type light-emitting element, and the second first-type light-emitting element in the second direction.

In an embodiment, the plurality of pixel units may be repeatedly arranged along a first direction and a second direction crossing the first direction; the first first-type light-emitting element and the first second-type light-emitting element may be arranged to be spaced apart from each other in the second direction; the second first-type light-emitting element and the second second-type light-emitting element may be arranged to be spaced apart from each other in the second direction; the third first-type light-emitting element and the third second-type light-emitting element may be arranged to be spaced apart from each other in the second direction; the first first-type light-emitting element may be arranged to be spaced apart from the second first-type light-emitting element in the first direction; and the first second-type light-emitting element may be arranged to be spaced apart from the second second-type light-emitting element in the first direction.

In an embodiment, the plurality of barrier ribs may include a barrier rib extending in the first direction and overlapping both the first second-type light-emitting element and the second second-type light-emitting element.

In an embodiment, the plurality of barrier ribs may include: a first barrier rib extending in the first direction and overlapping the first second-type light-emitting element; and a second barrier rib extending in the first direction, spaced apart from the first barrier rib, and overlapping the second second-type light-emitting element.

In an embodiment, X may be twice Y.

In an embodiment of the invention, a pixel includes: a pixel driving circuit; a first-type light-emitting element electrically connected to the pixel driving circuit; and a second-type light-emitting element electrically connected to the pixel driving circuit, where the pixel driving circuit may include: a driving transistor including a first electrode, a second electrode, and a gate electrode; a switching transistor connected between the first electrode of the driving transistor and a data line; a first light-emitting control transistor connected between the second electrode of the driving transistor and the first-type light-emitting element; and a second light-emitting control transistor connected between the second electrode of the driving transistor and the second-type light-emitting element.

In an embodiment, the pixel driving circuit may further include a third light-emitting control transistor connected between a driving voltage line and the first electrode of the driving transistor.

In an embodiment, the pixel driving circuit may further include a fourth light-emitting control transistor connected between a first driving voltage line and the first electrode of the driving transistor.

In an embodiment, the pixel driving circuit may further include: a first initialization transistor connected between an initialization voltage line and a first node between the first light-emitting control transistor and the first-type light-emitting element; and a second initialization transistor connected between the initialization voltage line and a second node between the second light-emitting control transistor and the second-type light-emitting element.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain principles of the invention. In the drawings.

DETAILED DESCRIPTION

Figure 1A:
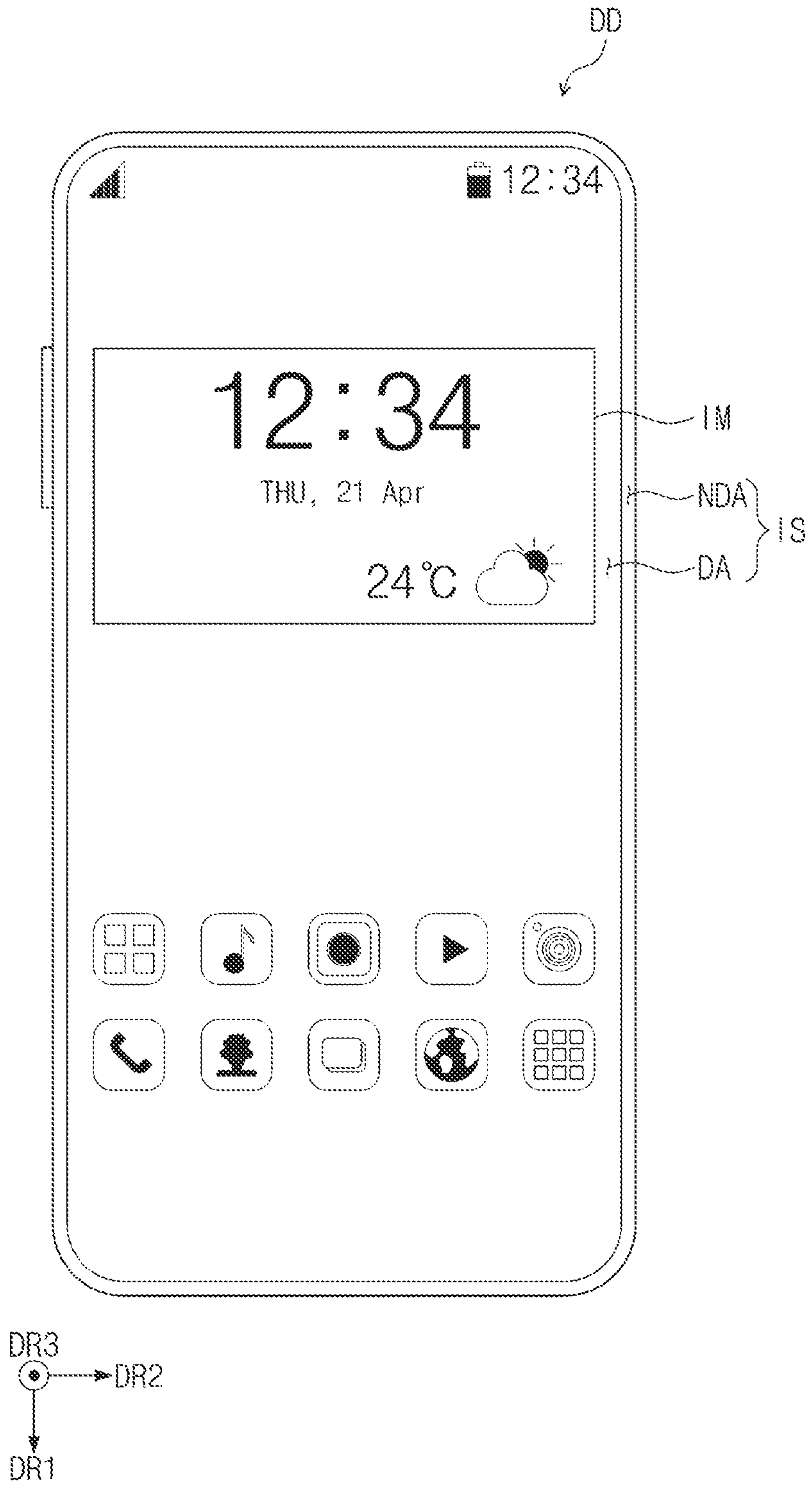
FIG. 1A is a front view of a display device according to an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In this specification, it will be understood that when an element (or region, layer, portion, etc.) is referred to as being "on", "connected to" or "coupled to" another element, it can be directly on, connected or coupled to the other element, or intervening elements may be present.

Like reference numerals refer to like elements throughout. In addition, in the drawings, the thicknesses, ratios, and dimensions of elements are exaggerated for effective description of the technical contents.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items.

It will be understood that, although the terms first, second, etc. may be used herein to describe various elements, these elements should not be limited by these terms. These terms are only used to distinguish one element from another element. For example, a first element could be termed a second element without departing from the scope of the present invention. Similarly, the second element may also be referred to as the first element. The terms of a singular form include plural forms unless otherwise specified.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described with reference to the accompanying drawings.

Figure 1B:
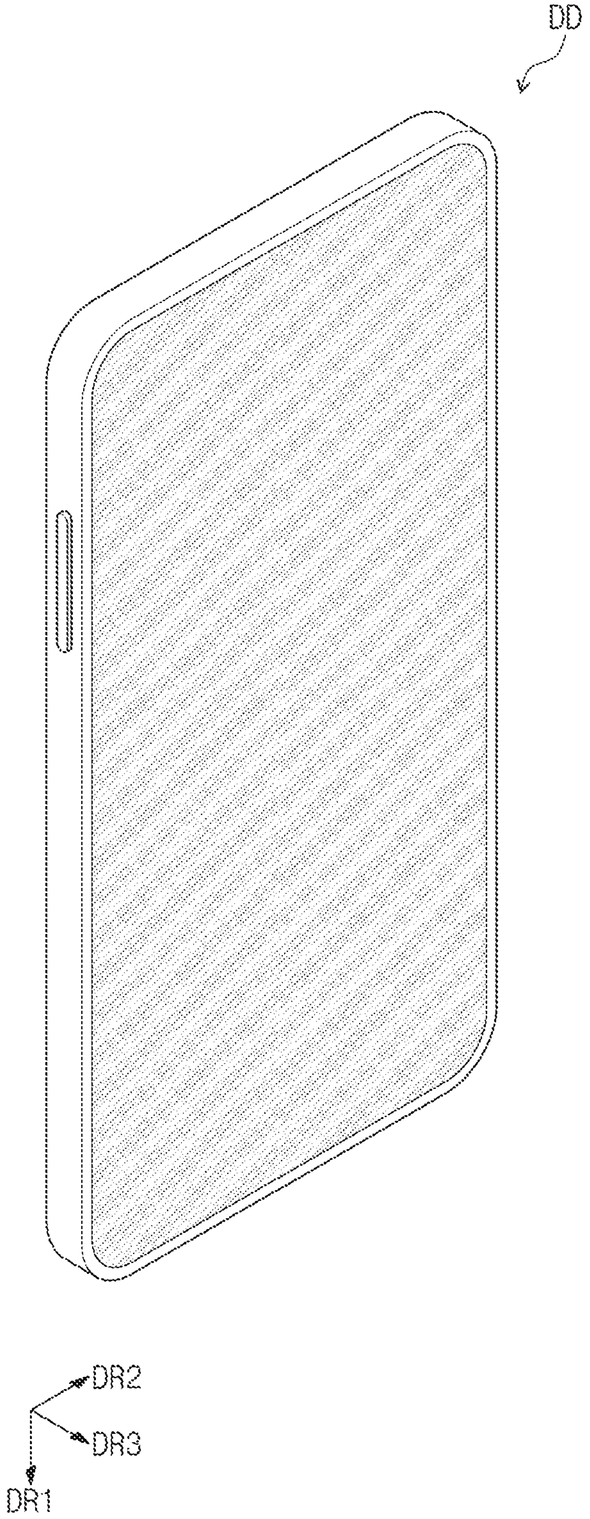
FIG. 1B is a perspective view of the display device according to an embodiment of the invention.

FIG. 1A is a front view of a display device according to an embodiment of the invention. FIG. 1B is a perspective view of the display device according to an embodiment of the invention.

Referring to FIGS. 1A and 1B, an embodiment of the display device DD may be activated based on an electrical signal. The display device DD may be applied to electronic devices such as a mobile phone, a tablet, a smart watch, a laptop computer, a computer, and a smart television.

The display device DD may display an image on a display surface IS parallel to each of a first direction DR1 and a second direction DR2. The display surface IS on which an image is displayed may correspond to the front surface of the display device DD. The image may include a still image as well as a dynamic image. The normal direction of the display surface IS, that is, the thickness direction of the display device DD, is indicated by a third direction DR3. The front surface (or upper surface) and the rear surface (or lower surface) of each layer or unit described hereinafter are divided by the third direction DR3.

The display surface IS of the display device DD may be divided into a display region DA and a non-display region NDA. The display region DA may be a region in which an image is displayed. A user visually recognizes an image through the display region DA. In an embodiment, as shown in FIG. 1A, the display region DA may have a tetragonal shape with rounded vertices. However, this is illustrated as an example, and the display region DA may have various shapes, and the shape thereof is not limited to any one embodiment.

The non-display region NDA is adjacent to the display region DA. The non-display region NDA may have a predetermined color. The non-display region NDA may surround the display region DA. Accordingly, the shape of the display region DA may be substantially defined by the non-display region NDA. However, this is illustrated as an example, and the non-display region NDA may be disposed adjacent to only one side of the display region DA or may be omitted in an alternative embodiment. The display device DD according to an embodiment of the invention may be variously modified and is not limited to any one embodiment.

FIG. 1A may be a front view of the display device DD that operates in a first mode or a second mode. FIG. 1B may be a side perspective view of the display device DD that operates in the second mode. In an embodiment, for example, the first mode may be a normal mode for displaying a screen at a first viewing angle, and the second mode may be a viewing angle control mode for displaying a screen at a second viewing angle narrower than the first viewing angle. The second mode may be referred to as a privacy mode, a privacy protection mode, or the like. The first viewing angle and the second viewing angle may be defined as angles at which an image may be viewed without distortion of image quality with respect to the normal direction of the display surface IS.

Referring to FIG. 1A, in an embodiment, when the display device DD is viewed from the front (or a direction parallel to the normal direction or the third direction DR3) in the first mode or the second mode, images IM generated by the display device DD may be viewed by a user. In such an embodiment, when the display device DD is viewed at an angle exceeding the second viewing angle in the second mode, the images IM may not be viewed by a user. In such an embodiment, when the display device DD is viewed at an angle exceeding the second viewing angle in the first mode, the images IM may be viewed by a user.

The second viewing angle in the second mode and luminance at the second viewing angle may be variously set. In an embodiment, for example, the second viewing angle may be about 45 degrees, and the luminance at about 45 degrees may be about 10% of the maximum luminance, but the embodiment of the invention is not particularly limited thereto.

The display device DD may selectively operate in one of a first mode for displaying an image on a screen with a first viewing angle and a second mode for displaying an image on a screen with a second viewing angle narrower than the first viewing angle. Conversion from the first mode to the second mode may be performed by a user, or when a specific application is executed, the first mode may be converted into the second mode. In an embodiment, for example, when an application with risk of exposing personal information, such as a bank or memo application, is executed, the display device DD may be converted from the first mode to the second mode.

Figure 2A:
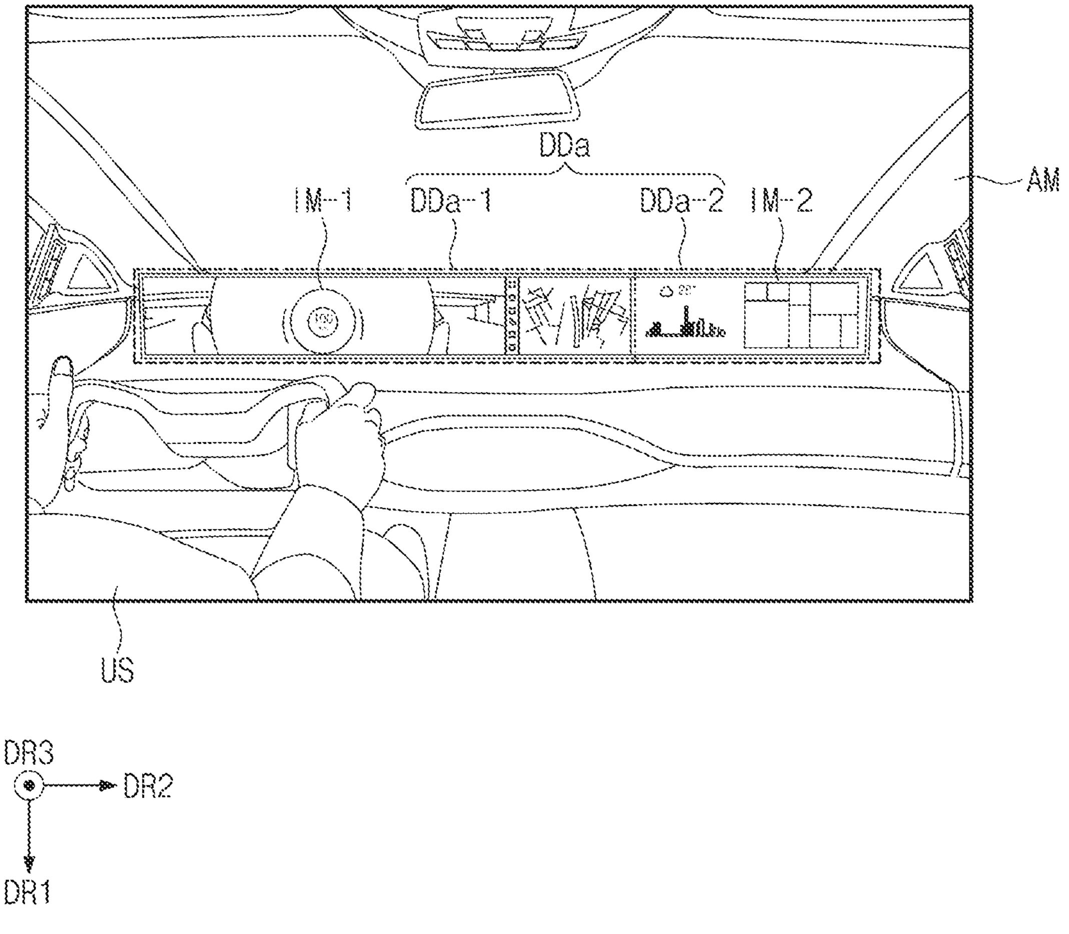
FIG. 2A illustrates an interior of a vehicle in which a display device according to an embodiment of the invention is disposed.
Figure 2B:
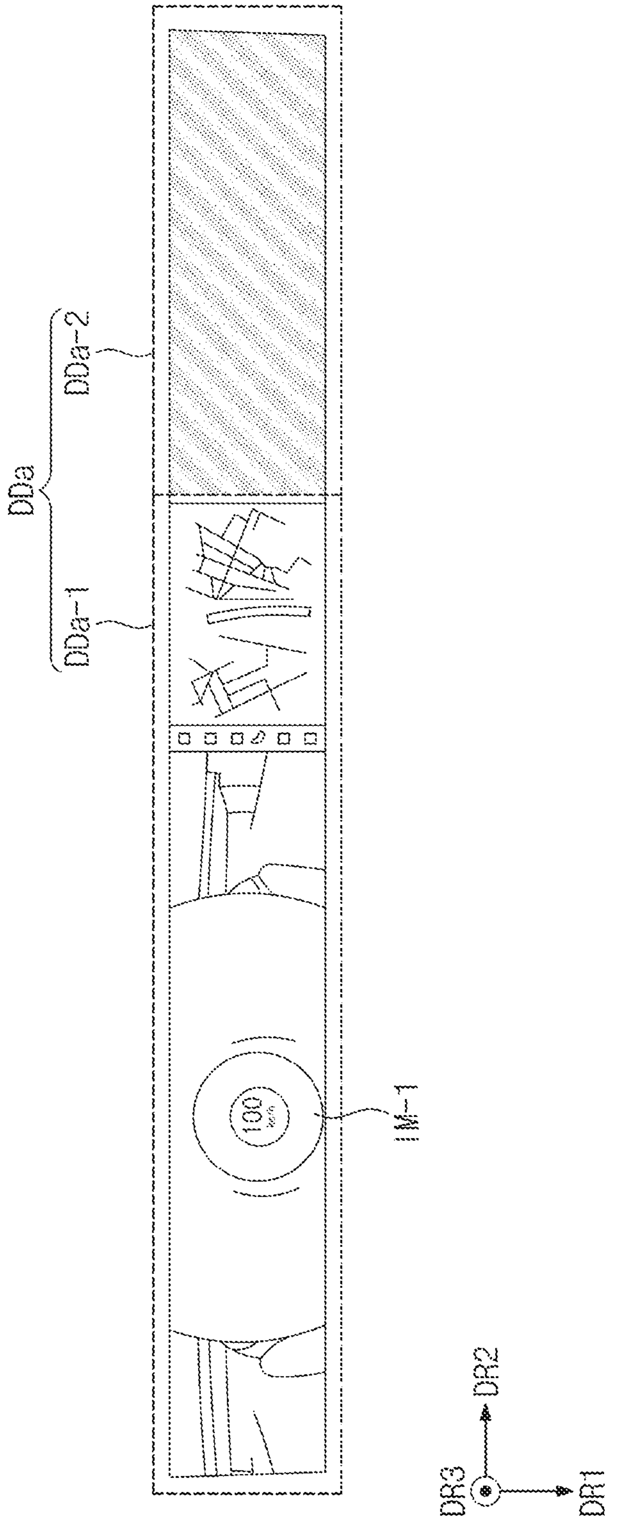
FIG. 2B illustrates an image viewed from a driver's seat when the display device according to an embodiment of the invention operates in a second mode.

FIG. 2A illustrates an interior of a vehicle in which a display device DDa according to an embodiment of the invention is disposed. FIG. 2B illustrates an image viewed from a driver's seat when the display device DDa according to an embodiment of the invention operates in the second mode.

Referring to FIG. 2A, an embodiment of the display device DDa may be disposed inside a vehicle AM. The display device DDa may be disposed inside the vehicle AM to provide a variety of information to a driver US. The display device DDa may include a first display device DDa-1 and a second display device DDa-2. The first display device DDa-1 may provide a first image IM-1 providing information for driving to the driver US who is driving a vehicle. The second display device DDa-2 may be disposed at a position facing the passenger seat and provide a second image IM-2. For example, the first image IM-1 may display speed information, vehicle condition information, vehicle interior operation information, navigation information, and the like, and the second image IM-2 may display not only information for driving, but also a variety of information unrelated to driving.

In an embodiment of the invention, the first display device DDa-1 and the second display device DDa-2 may be independent of each other or may be a single display device including one panel. In an embodiment where the first display device DDa-1 and the second display device DDa-2 are independent of each other, the operation of the first display device DDa-1 may not control the viewing angle (or have a fixed viewing angle), and the second display device DDa-2 may operate in the first mode or in the second mode. In an embodiment where the first display device DDa-1 and the second display device DDa-2 are portions of one display device DDa, all of the first display device DDa-1 and the second display device DDa-2 may operate in the first mode or in the second mode. Alternatively, only the second display device DDa-2 may partially operate in the first mode or in the second mode.

The first mode may be a normal mode for displaying an image on a screen with a first viewing angle, and the second mode may be a viewing angle control mode for displaying an image on a screen with a second viewing angle narrower than the first viewing angle. The second viewing angle of the second mode and luminance at the second viewing angle may be variously set. In an embodiment, for example, the second viewing angle and the luminance at the second viewing angle may be set according to the regulations of each country in which the vehicle AM is driven. In an embodiment, for example, the second viewing angle may be about 35 degrees, and the luminance at about 35 degrees may be about 0.75% of the maximum luminance, but the embodiment of the invention is not particularly limited thereto.

FIG. 2B illustrates an image viewed by a driver US who is driving a vehicle. The driver US may view only the first image IM-1 provided for driving, and may not view the second image IM-2 (see FIG. 2A) which may display information unrelated to driving due to limitation of the viewing angle.

Conversion between the first mode and the second mode may be determined depending on whether a vehicle AM is being driven or is stopped. In an embodiment, for example, when the vehicle AM is being driven, at least the second display device DDa-2 may operate in the second mode. In such an embodiment, when the vehicle AM is stopped, the second display device DDa-2 may operate in the first mode. Alternatively, even though the vehicle AM is being driven, the second display device DDa-2 may operate in the first mode when the vehicle AM is in an autonomous driving mode. When the second display device DDa-2 operates in the first mode, the driver US may view the first image IM-1 illustrated in FIG. 2A.

Figure 3A:
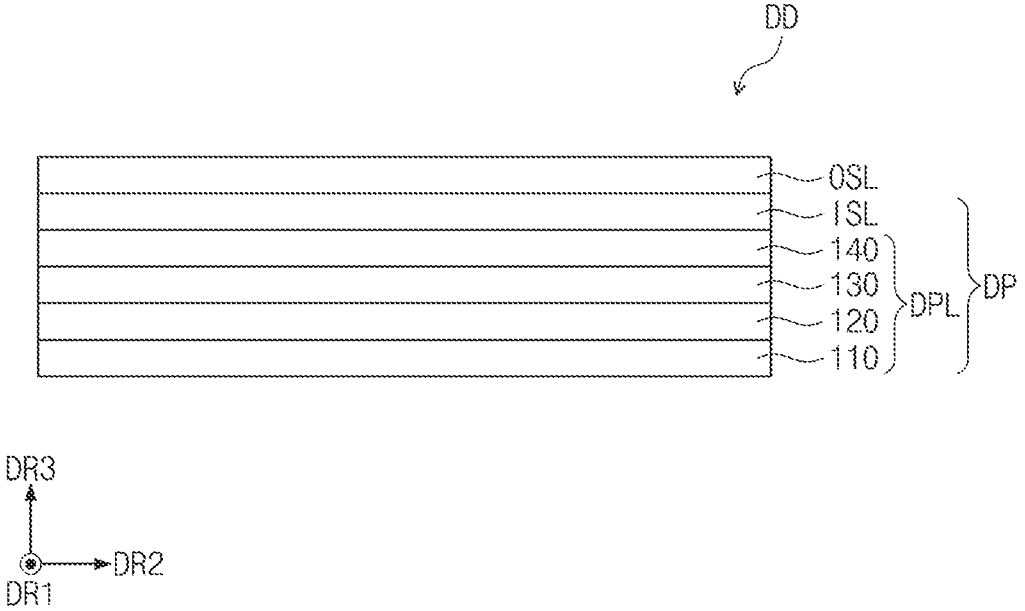
FIG. 3A is a cross-sectional view of a display device according to an embodiment of the invention.

FIG. 3A is a cross-sectional view of the display device DD according to an embodiment of the invention.

Referring to FIG. 3A, an embodiment of the display device DD may include a display panel DP and a light path control layer OSL. A protective film, a window, or a functional coating layer, which provide the front surface of the display device DD, may be further disposed on the light path control layer OSL.

The display panel DP may include a display layer DPL and a sensor layer ISL.

The display layer DPL may include a base layer 110, a circuit layer 120, a light-emitting element layer 130, and an encapsulation layer 140. The display layer DPL may be a component that substantially generates an image. The display layer DPL may be a light-emitting display layer. In an embodiment, for example, the display layer DPL may include an organic light-emitting display layer, an inorganic light-emitting display layer, an organic-inorganic light-emitting display layer, a quantum dot display layer, a micro light emitting diode (LED) display layer, or a nano LED display layer.

The sensor layer ISL may sense an external input applied from the outside. The external input may be a user's input. The user's input may include various types of external inputs, such as a part of the user's body, light, heat, a pen, or pressure. The sensor layer ISL may be referred to as a sensor, an input sensing layer, or an input sensing panel. The sensor layer ISL may be formed through a continuous process with the display layer DPL and disposed directly on the display layer DPL. However, the embodiment of the invention is not particularly limited thereto. In an alternative embodiment, for example, the sensor layer ISL may be coupled to the display layer DPL by an adhesive layer.

The light path control layer OSL may control a path of light provided from the display layer DPL. The light path control layer OSL may include a structure for controlling the path of light. The light path control layer OSL may be disposed on the sensor layer ISL. The light path control layer OSL may be formed through a continuous process with the display layer DPL and the sensor layer ISL and disposed directly on the sensor layer ISL. However, the embodiment of the invention is not particularly limited thereto. For example, the light path control layer OSL may be coupled to the sensor layer ISL by an adhesive layer.

Figure 3B:
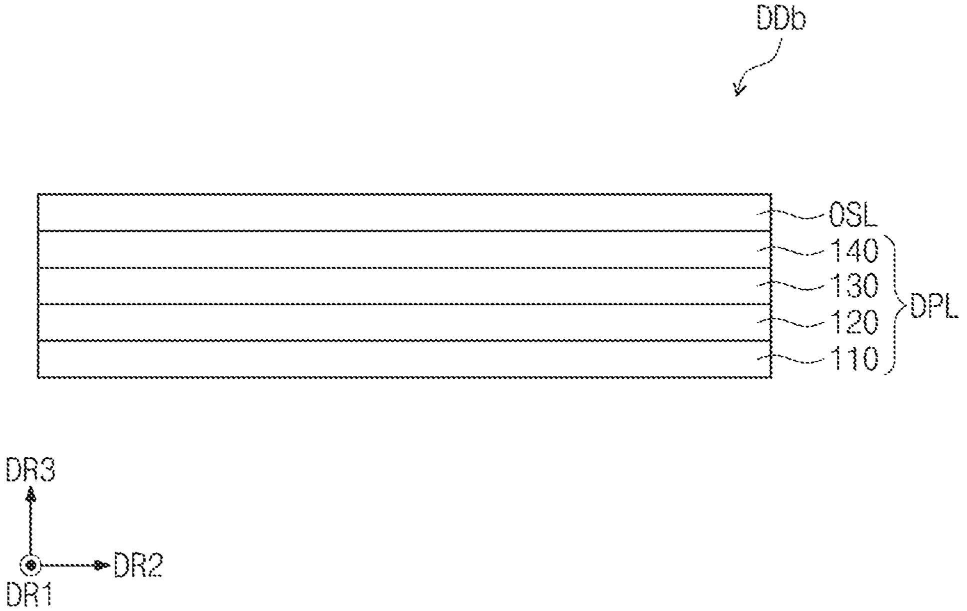
FIG. 3B is a cross-sectional view of a display device according to an embodiment of the invention.

FIG. 3B is a cross-sectional view of a display device DDb according to an embodiment of the invention.

Referring to FIG. 3B, an embodiment of the display device DDb may include a display layer DPL and alight path control layer OSL. In such an embodiment, the display device DDb may not include the sensor layer ISL (see FIG. 3A). The light path control layer OSL may be formed through a continuous process with the display layer DPL and disposed directly on the display layer DPL. However, the embodiment of the invention is not particularly limited thereto.

Figure 4:
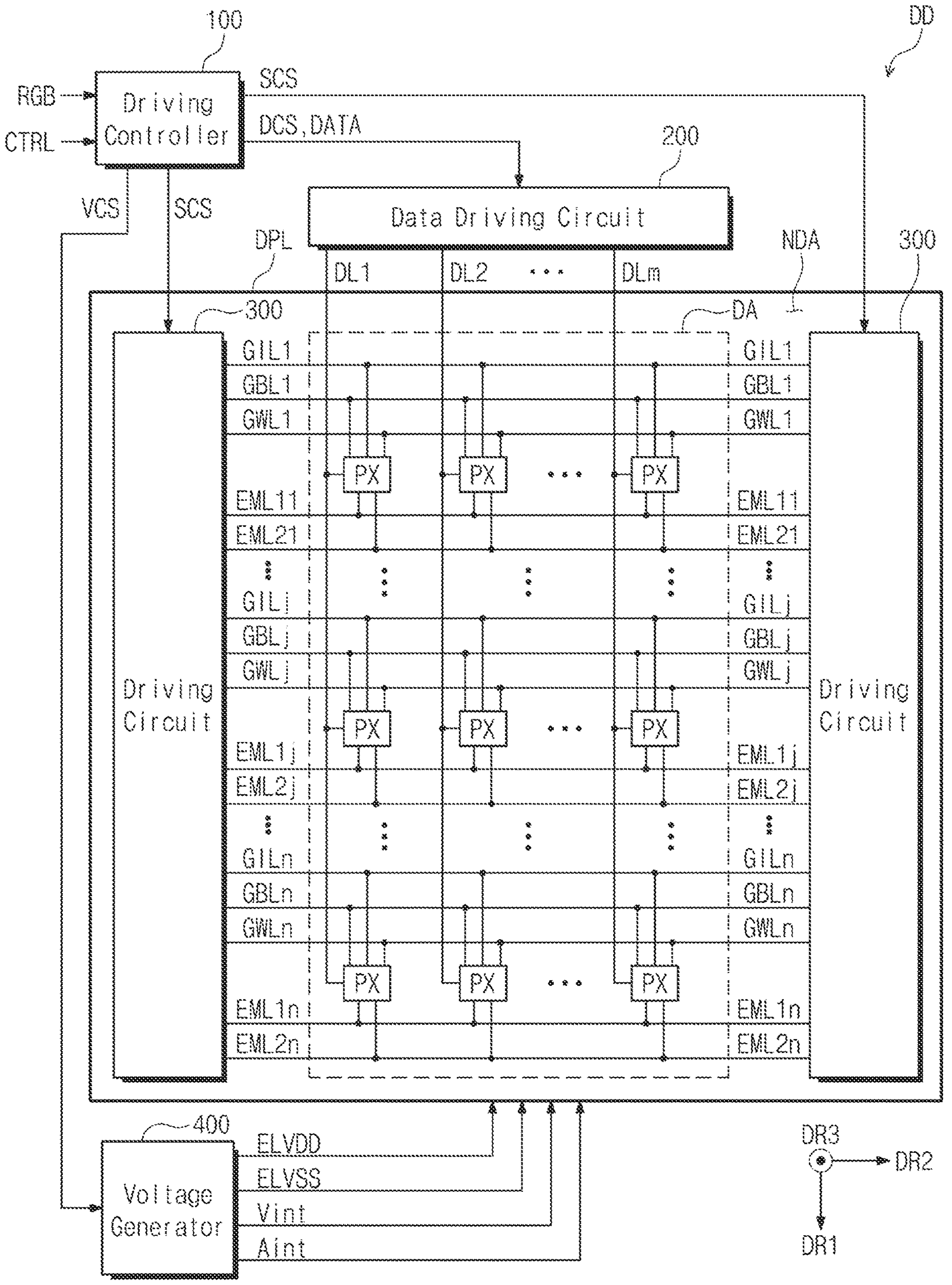
FIG. 4 is a block diagram of a display device according to an embodiment of the invention.

FIG. 4 is a block diagram of the display device DD according to an embodiment of the invention.

Referring to FIG. 4, an embodiment of the display device DD may include a display panel layer DPL, and a panel driver and a driving controller 100 for driving the display layer DPL. In an embodiment of the invention, the panel driver may include a data driving circuit 200 (or a data driver), driving circuits 300, and a voltage generator 400.

The display layer DPL may include a display region DA and a non-display region NDA. The display layer DPL may include a plurality of pixels PX disposed in the display region DA. Each of the plurality of pixels PX includes at least one light-emitting element EDt1 and Edt2 (see FIG. 14) and a pixel driving circuit PXC (see FIG. 14) configured to control the light emission of the light-emitting element ED. The pixel driving circuit PXC may include one or more transistors and one or more capacitors.

The display layer DPL may further include initialization scan lines GIL1 to GILn, write scan lines GWL1 to GWLn, black scan lines GBL1 to GBLn, first light-emitting control lines EML11 to EML1*n*, second light-emitting control lines EML21 to EML2*n*, and data lines DL1 to DLm. Here, each of n and m is a positive integer greater than or equal to 2. In an embodiment of the invention, the display layer DPL may further include third light-emitting control lines (not shown).

The driving controller 100 receives an image signal RGB and a control signal CTRL from an outside or an external device. The driving controller 100 generates an image data signal DATA obtained by converting the data format of the image signal RGB to meet the interface specifications with the data driving circuit 200. The driving controller 100 may output a first control signal SCS, a second control signal DCS, and a third control signal VCS, which are generated based on the image signal RGB and the control signal CTRL.

The data driving circuit 200 receives the second control signal DCS and the image data signal DATA from the driving controller 100. The data driving circuit 200 converts the image data signal DATA into data signals and outputs the data signals to the data lines DL1 to DLm. The data signals are analog voltages corresponding to the grayscale values of the image data signal DATA. The data lines DL1-DLm may be arranged along the second direction DR2, and each of the data lines DL1-DLm may extend along the first direction DR1.

In an embodiment, the driving circuit 300 may be disposed in the non-display region NDA of the display layer DPL, but is not particularly limited thereto. In an alternative embodiment, for example, at least a portion of the driving circuit 300 may be disposed in the display region DA. The driving circuits 300 may include transistors formed through a same process as those of the pixel driving circuit PXC (see FIG. 14).

The driving circuit 300 may receive the first control signal SCS and output a scan signal or a light-emitting control signal to the initialization scan lines GIL1 to GILn, the write scan lines GWL1 to GWLn, the black scan lines GBL1 to GBLn, the first light-emitting control lines EML11 to EML1*n*, and the second light-emitting control lines EML21 to EML2*n*.

The driving circuit 300 may be provided in plural. In an embodiment, for example, the plurality of driving circuits 300 may be spaced apart from each other with the display region DA interposed therebetween. Each of the initialization scan lines GIL1 to GILn, the write scan lines GWL1 to GWLn, the black scan lines GBL1 to GBLn, the first light-emitting control lines EML11-EML1*n*, and the second light-emitting control lines EML21 to EML2*n* may be electrically connected to the driving circuits 300 and respectively receive signals from the driving circuits 300. In an embodiment, for example, each of one initialization scan line GILL one write scan line GWL1, one black scan line GBL1, one first light-emitting control line EML11, and one second light-emitting control line EML21 may receive a same signal from two driving circuits 300. However, this is just an example, and one of the two driving circuits 300 illustrated in FIG. 4 may be omitted in an alternative embodiment.

Each of the driving circuits 300 may include: a scan driving circuit connected to the initialization scan lines GIL1 to GILn, the write scan lines GWL1 to GWLn, and the black scan lines GBL1 to GBLn; and a light-emitting control driving circuit connected to the first light-emitting control lines EML11 to EML1*n* and the second light-emitting control lines EML21 to EML2*n*. In an embodiment of the invention, the scan driving circuit and the light-emitting control driving circuit may be spaced apart from each other with the display region DA interposed therebetween.

Each of the initialization scan lines GIL1 to GILn, the write scan lines GWL1 to GWLn, the black scan lines GBL1 to GBLn, the first light-emitting control lines EML11-EML1*n*, and the second light-emitting control lines EML21 to EML2*n* may extend in the second direction DR2, and the initialization scan lines GIL1 to GILn, the write scan lines GWL1 to GWLn, the black scan lines GBL1 to GBLn, the first light-emitting control lines EML11-EML1*n*, and the second light-emitting control lines EML21 to EML2*n* may be spaced apart from each other in the first direction DR1.

Each of the plurality of pixels PX may be electrically connected to three scan lines, two light-emitting control lines, and one data line. In an embodiment, for example, as illustrated in FIG. 4, pixels in a first row may be connected to scan lines GIL1, GWL1, and GBL1, and first and second light-emitting control lines EML11 and EML21. Pixels in a first column may be connected to the data line DL1. In addition, pixels in a j-th row may be connected to scan lines GILj, GWLj, and GBLj, and first and second light-emitting control lines EML1*j* and EML2*j*.

The voltage generator 400 generates voltages used for the operation of the display panel DP. In an embodiment, the voltage generator 400 may generate a first driving voltage ELVDD, a second driving voltage ELVSS, a first initialization voltage Vint, and a second initialization voltage Aint.

Figure 5:
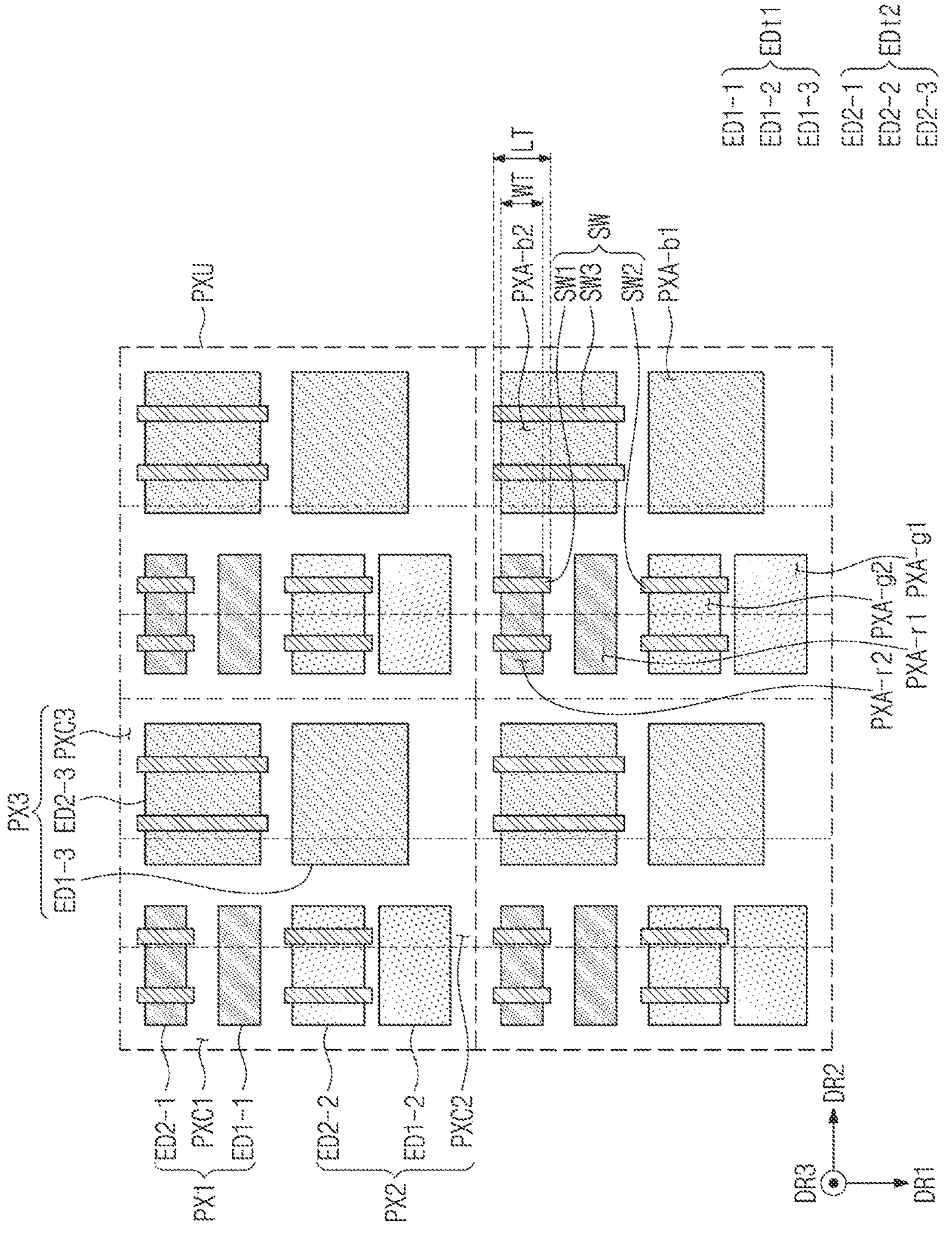
FIG. 5 is an enlarged plan view of a portion of the display device according to an embodiment of the invention.

FIG. 5 is an enlarged plan view of a portion of the display device DD (see FIG. 4) according to an embodiment of the invention.

Referring to FIGS. 4 and 5, an embodiment of the display layer DPL may include a plurality of pixel units PXU. The plurality of pixel units PXU may be repeatedly arranged along the first direction DR1 and the second direction DR2 crossing the first direction DR1. FIG. 5 illustrates only four pixel units PXU among the plurality of pixel units PXU for convenience of illustration, but not being limited thereto.

Each of the plurality of pixel units PXU may include a plurality of pixels PX1, PX2, and PX3. In an embodiment, for example, the plurality of pixel units PXU may include or be defined by a first color pixel PX1, a second color pixel PX2, and a third color pixel PX3. FIG. 5 illustrates an embodiment where one pixel unit PXU includes three pixels PX1, PX2, and PX3, but not being limited thereto. Alternatively, one pixel unit PXU may include four or more pixels, or two pixels.

Each of the plurality of pixel units PXU may include a plurality of light-emitting elements EDt1 and EDt2. The plurality of light-emitting elements EDt1 and EDt2 may include a first-type light-emitting elements EDt1 non-overlapping barrier ribs SW included in the light path control layer OSL (see FIG. 3A) and a second-type light-emitting elements EDt2 overlapping the barrier ribs SW.

The first-type light-emitting elements EDt1 may be controlled to operate when the display device DD operates in the first mode described above with reference to FIGS. 1A, 1B, 2A, and 2B and not to operate when the display device DD operates in the second mode. The second-type light-emitting elements EDt2 may be controlled to operate when the display device DD operate in the second mode. According to an embodiment of the invention, the second-type light-emitting elements EDt2 may be controlled to operate even when the display device DD operate in the first mode, and a detailed description thereof will be given later.

According to an embodiment of the invention, each of the first, second, and third color pixels PX1, PX2, and PX3 may include one pixel driving circuit and at least two light-emitting elements. In an embodiment, for example, each of the first, second, and third color pixels PX1, PX2, and PX3 may include one of the first-type light-emitting elements EDt1 and one of the second-type light-emitting elements EDt2. In such an embodiment, each of the resolution of the display device DD at the time of operating in the first mode and the resolution of the display device DD at the time of operating in the second mode may be the same as the original resolution of the display device DD. Accordingly, the display device DD may provide an image without deterioration of resolution even when converted from one mode into the other mode having a different viewing angle.

The first-type light-emitting elements Edt1 may include a first first-type light-emitting element ED1-1, a second first-type light-emitting element ED1-2, and a third first-type light-emitting element ED1-3, and the second-type light-emitting elements Edt2 may include a first second-type light-emitting element ED2-1, a second second-type light-emitting element ED2-2, and a third second-type light-emitting element ED2-3.

The first color pixel PX1 may include a first pixel driving circuit PXC1, a first first-type light-emitting element ED1-1, and a first second-type light-emitting element ED2-1. The second color pixel PX2 may include a second pixel driving circuit PXC2, a second first-type light-emitting element ED1-2, and a second second-type light-emitting element ED2-2. The third color pixel PX3 may include a third pixel driving circuit PXC3, a third first-type light-emitting element ED1-3, and a third second-type light-emitting element ED2-3.

In an embodiment of the invention, a color of light provided from the first first-type light-emitting element ED1-1 may be substantially the same as a color of light provided from the first second-type light-emitting element ED2-1, a color of light provided from the second first-type light-emitting element ED1-2 may be substantially the same as a color of light provided from the second second-type light-emitting element ED2-2, and a color of light provided from the third first-type light-emitting element ED1-3 and a color of light provided from the third second-type light-emitting element ED2-3 may be substantially the same as each other. In an embodiment, for example, red light may be emitted from the first first-type light-emitting element ED1-1, green light may be emitted from the second first-type light-emitting element ED1-2, and blue light may be emitted from the third first-type light-emitting element ED1-3.

In an embodiment of the invention, the first first-type light-emitting element ED1-1, the second first-type light-emitting element ED1-2, and the third first-type light-emitting element ED1-3 may emit source light having a same color as each other. in an embodiment, for example, the source light may be blue light. In such an embodiment, the color of the source light may be converted or transmitted in a region overlapping each of the light-emitting elements and then output to the outside. In an embodiment, for example, red light may be emitted from a region overlapping the first first-type light-emitting element ED1-1 of the display device DD, green light may be emitted from a region overlapping the second first-type light-emitting element ED1-2 thereof, and blue light may be emitted from a region overlapping the third first-type light-emitting element ED1-3 thereof.

According to an embodiment of the invention, each of the plurality of pixel units PXU may include X light-emitting elements ED1-1, ED1-2, ED1-3, ED2-1, ED2-2, ED2-3, and Y pixel driving circuits PXC1, PXC2, and PXC3. X may be a positive integer, and Y may be a positive integer less than X. Since one pixel includes one pixel driving circuit, a first-type light-emitting element, and a second-type light-emitting element, X may be twice as great as Y (i.e., X=2Y). In an embodiment, as illustrated in FIG. 5, each of the plurality of pixel units PXU may include six light-emitting elements ED1-1, ED1-2, ED1-3, ED2-1, ED2-2, and ED2-3 and three pixel driving circuits PXC1, PXC2, and PXC3.

According to an embodiment of the invention, the first-type light-emitting elements EDt1 and the second-type light-emitting elements EDt2 may have a structure in which they are staggered from each other in one pixel unit PXU. In an embodiment, for example, the first second-type light-emitting element ED2-1, the first first-type light-emitting element ED1-1, the second second-type light-emitting element ED2-2, and the second first-type light-emitting element ED1-2 may be arranged along the first direction DR1. The third second-type light-emitting element ED2-3 and the third first-type light-emitting element ED1-3 may be arranged along the first direction DR1. The third second-type light-emitting element ED2-3 and the third first-type light-emitting element ED1-3 may be spaced apart from the first second-type light-emitting element ED2-1, the first first-type light-emitting element ED1-1, the second second-type light-emitting element ED2-2, and the second first-type light-emitting element ED1-2 in the second direction DR2. However, the arrangement of the first-type light-emitting elements EDt1 and the second-type light-emitting elements EDt2 is not limited to the above examples.

Figure 7:
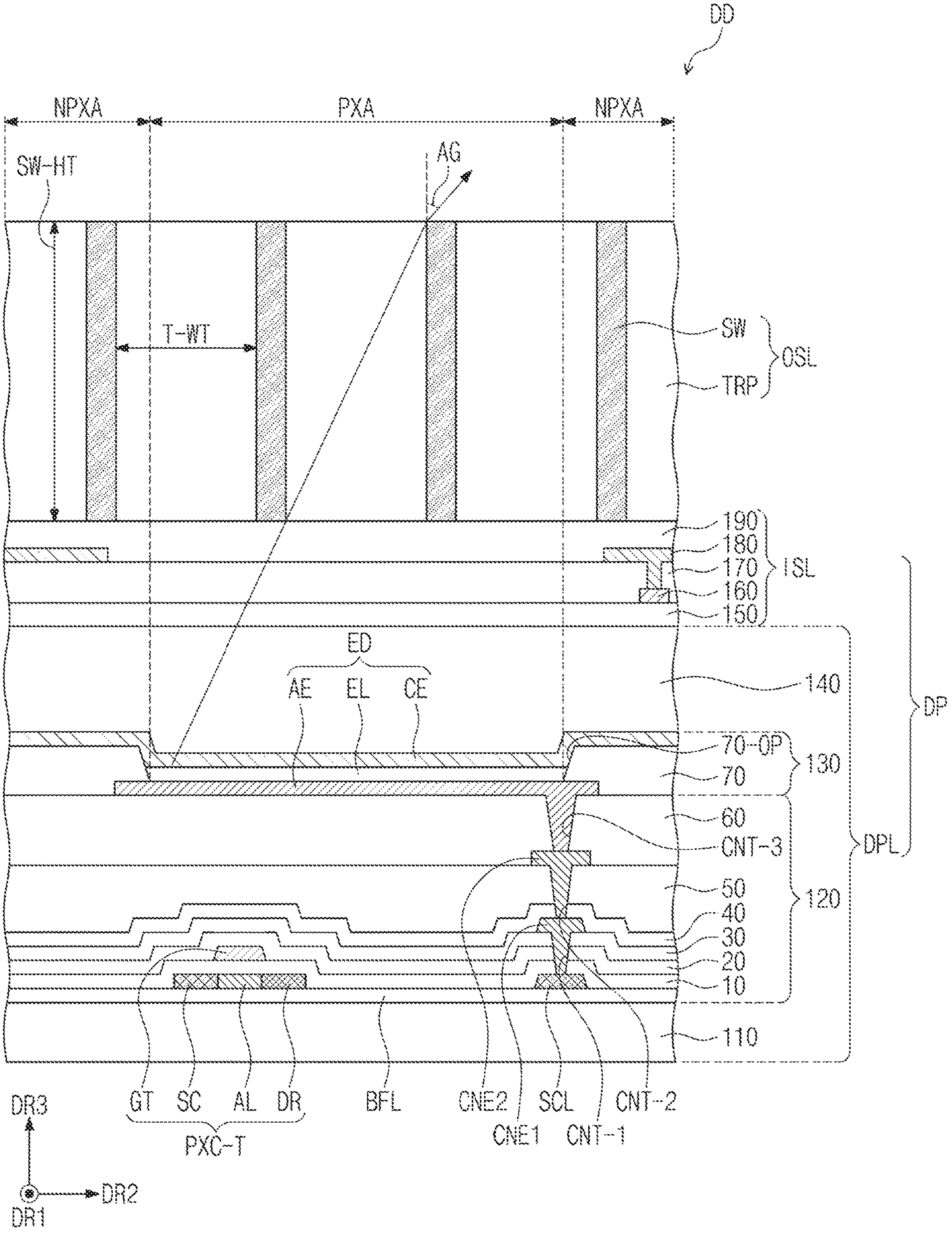
FIG. 7 is a cross-sectional view of a display device according to an embodiment of the invention.

The shape of each of the light-emitting elements ED1-1, ED1-2, ED1-3, ED2-1, ED2-2, and ED2-3 illustrated in FIG. 5 may correspond to the shape of the light-emitting region PXA defined by a pixel defining film 70 illustrated in FIG. 7. The barrier ribs SW may not overlap first light-emitting regions PXA-r1, PXA-g1, and PXA-b1 of the first-type light-emitting elements EDt1. The barrier ribs SW may include: first barrier ribs SW1 overlapping a first second light-emitting region PXA-r2 of the first second-type light-emitting element ED2-1; second barrier ribs SW2 overlapping a second second light-emitting region PXA-g2 of the second second-type light-emitting element ED2-2; and third barrier ribs SW3 overlapping a third second light-emitting region PXA-b2 of the third second-type light-emitting element ED2-3. FIG. 5 illustrates an embodiment where two first barrier ribs SW1, two second barrier ribs SW2, and two third barrier ribs SW3 respectively overlap a corresponding first second light-emitting region PXA-r2, a corresponding second second light-emitting region PXA-g2, and a corresponding third second light-emitting region PXA-b2, but the number of the first to third barrier ribs SW1, SW2, and SW3 is not limited thereto.

Each of the first to third barrier ribs SW1, SW2, and SW3 may extend in the first direction DR1. In an embodiment, for example, an extension direction of the first to third barrier ribs SW1, SW2, and SW3 may be perpendicular to the direction of a target viewing angle. A width WT of the first second light-emitting region PXA-r2 in the first direction DR1 may be less than the length LT of each of the first barrier ribs SW1 in the first direction DR1. Accordingly, the viewing angle of light emitted from the first second light-emitting region PXA-r2 may be more easily controlled. In addition, each of the second and third barrier ribs SW2 and SW3 may have a length greater than the widths of the second second light-emitting region PXA-g2 and the third second light-emitting region PXA-b2.

Figure 6A:
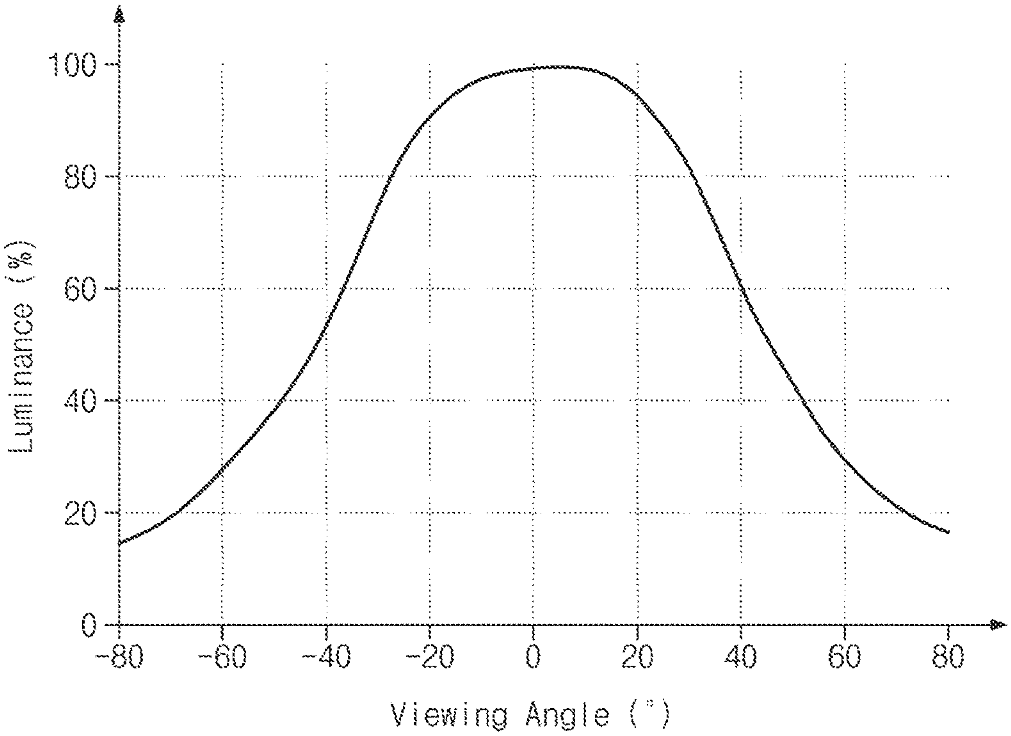
FIG. 6A is a graph illustrating luminance versus a viewing angle when first-type light-emitting elements emit light.
Figure 6B:
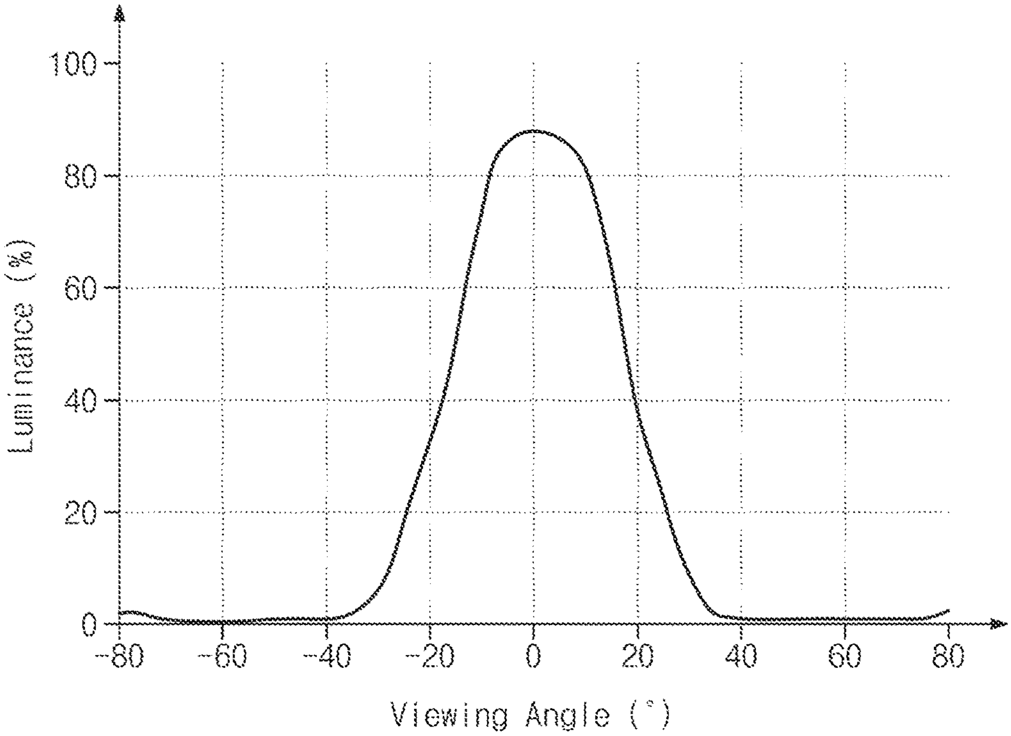
FIG. 6B is a graph illustrating luminance versus a viewing angle when second-type light-emitting elements emit light.

FIG. 6A is a graph illustrating luminance versus a viewing angle when the first-type light-emitting elements EDt1 (see FIG. 5) emit light. FIG. 6B is a graph illustrating luminance versus a viewing angle when the second-type light-emitting elements EDt2 (see FIG. 5) emit light.

Referring to FIGS. 5 and 6A, when the first-type light-emitting elements EDt1 are in operation, the luminance at a viewing angle of about 45 degrees may be about 40% of the maximum luminance. Accordingly, an image displayed on the display device DD (see FIG. 1A) may be viewed at a viewing angle of about 45 degrees.

Referring to FIGS. 5 and 6B, when the second-type light-emitting elements EDt2 are in operation, the luminance at a viewing angle of about 45 degrees may be close to about 0% of the maximum luminance. Accordingly, an image displayed on the display device DD (see FIG. 1A) may not be viewed at a viewing angle of about 45 degrees.

According to an embodiment of the invention, the display device DD (see FIG. 1A) may be converted into the first mode in which the first-type light-emitting elements EDt1 operate or into the second mode in which only the second-type light-emitting elements EDt2 operate. In an embodiment, for example, according to a user's selection or a predetermined regulation, the display device DD (see FIG. 1A) may operate in the second mode in which the viewing angle is controlled.

FIG. 7 is a cross-sectional view of the display device DD according to an embodiment of the invention.

Referring to FIG. 7, in an embodiment, the display layer DPL may include a base layer 110, a circuit layer 120, a light-emitting element layer 130, and an encapsulation layer 140.

The base layer 110 may be a member that provides a base surface on which the circuit layer 120 is disposed. The base layer 110 may include a synthetic resin layer. In an embodiment, for example, the synthetic resin layer may be a polyimide-based resin layer, but the material thereof is not particularly limited thereto. In an alternative embodiment, the base layer 110 may include a glass substrate, a metal substrate, an organic/inorganic composite material substrate, or the like. At least one inorganic layer of the circuit layer 120 is formed on the upper surface of the base layer 110. The inorganic layer may include (e.g., contain) at least one selected from aluminum oxide, titanium oxide, silicon oxide, silicon nitride, silicon oxynitride, zirconium oxide, and hafnium oxide. The inorganic layer may be formed in multiple layers, that is, have a multi-layered structure. The multi-layered inorganic layers may constitute a barrier layer and/or a buffer layer. In an embodiment, as shown in FIG. 7, the inorganic layer of the circuit layer 120 may include a buffer layer BFL.

The buffer layer BFL may improve the bonding strength between the base layer 110 and a semiconductor pattern. The buffer layer BFL may include at least one selected from silicon oxide, silicon nitride, and silicon oxynitride. In an embodiment, for example, the buffer layer BFL may include a structure in which a silicon oxide layer and a silicon nitride layer are alternately stacked.

A semiconductor pattern of the circuit layer 120 may be disposed on the buffer layer BFL. The semiconductor pattern may include polysilicon. Without being limited thereto, however, the semiconductor pattern may include amorphous silicon, low-temperature polycrystalline silicon, or oxide semiconductor.

FIG. 7 illustrates only a portion of the semiconductor pattern, and the semiconductor pattern may be further disposed in other regions. The semiconductor pattern may be arranged in a specific rule or pattern across the pixels. The semiconductor pattern may have different electrical properties depending on whether it is doped or not. The semiconductor pattern may include a first region having high conductivity and a second region having low conductivity. The first region may be doped with an N-type dopant or a P-type dopant. A P-type transistor may include a doped region doped with a P-type dopant, and an N-type transistor may include a doped region doped with an N-type dopant. The second region may be a non-doped region or a region doped with a lower concentration than the first region.

The conductivity of the first region may be greater than that of the second region, and the first region may substantially serve as an electrode or a signal line. The second region may substantially correspond to an active region (or channel) of a transistor. In such an embodiment, a portion of the semiconductor pattern may be an active region of a transistor, another portion thereof may be a source region or a drain region of a transistor, and still another portion thereof may be a connection electrode or a connection signal line.

For convenience of illustration, FIG. 7 illustrates one transistor PXC-T and one light-emitting element ED included in a pixel. The light-emitting element ED illustrated in FIG. 7 may be one of the second-type light-emitting elements EDt2 illustrated in FIG. 5.

A source region SC, an active region AL, and a drain region DR of the transistor PXC-T may be formed from (or defined by portions of) the semiconductor pattern. The source region SC and the drain region DR may extend in opposite directions from each other from the active region AL on a cross section. FIG. 7 illustrates a portion of a connection signal line SCL formed from the semiconductor pattern. Although not separately illustrated, the connection signal line SCL may be connected to the drain region DR of the transistor PXC-T on a plane.

A first insulating layer 10 of the circuit layer 120 may be disposed on the buffer layer BFL. The first insulating layer 10 may overlap a plurality of pixels in common and cover the semiconductor pattern. The first insulating layer 10 may be an inorganic layer and/or an organic layer and have a single-layered or multi-layered structure. The first insulating layer 10 may include at least one selected from aluminum oxide, titanium oxide, silicon oxide, silicon nitride, silicon oxynitride, zirconium oxide, and hafnium oxide. In an embodiment, the first insulating layer 10 may be a single-layered silicon oxide layer. The insulating layers of the circuit layer 120 to be described later as well as the first insulating layer 10 may be an inorganic layer and/or an organic layer and have a single-layered or multi-layered structure. The inorganic layer may include at least one selected from the above materials, but is not limited thereto.

A gate electrode GT of the transistor PXC-T is disposed on the first insulating layer 10. The gate electrode GT may be a portion of a metal pattern. The gate electrode GT overlaps the active region AL. In a process of doping the semiconductor pattern, the gate electrode GT may function (or be used) as a mask.

A second insulating layer 20 of the circuit layer 120 may be disposed on the first insulating layer 10 and cover the gate electrode GT. The second insulating layer 20 may overlap the pixels in common. The second insulating layer 20 may be an inorganic layer and/or an organic layer and have a single-layered or multi-layer structure. The second insulating layer 20 may include at least one selected from silicon oxide, silicon nitride, and silicon oxynitride. In an embodiment, the second insulating layer 20 may have a multi-layered structure including a silicon oxide layer and a silicon nitride layer.

A third insulating layer 30 of the circuit layer 120 may be disposed on the second insulating layer 20. The third insulating layer 30 may have a single-layered or multi-layered structure. In an embodiment, for example, the third insulating layer may have a multi-layered structure including a silicon oxide layer and a silicon nitride layer.

A first connection electrode CNE1 may be disposed on the third insulating layer 30. The first connection electrode CNE1 may be connected to the connection signal line SCL through a contact hole CNT-1 defined through the first, second, and third insulating layers 10, 20, and 30.

A fourth insulating layer 40 of the circuit layer 120 may be disposed on the third insulating layer 30. The fourth insulating layer 40 may be a single-layered silicon oxide layer. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be connected to the first connection electrode CNE1 through a contact hole CNT-2 defined through the fourth insulating layer 40 and the fifth insulating layer 50.

A sixth insulating layer 60 of the circuit layer 120 may be disposed on the fifth insulating layer 50 and cover the second connection electrode CNE2. The sixth insulating layer 60 may be an organic layer.

The stacking relationship of the circuit layer 120 illustrated in FIG. 7 is only an example and is not particularly limited thereto. In an embodiment, for example, at least one selected from the first to sixth insulating layers 10, 20, 30, 40, 50, and 60 may be omitted, and other insulating layers may be further added.

The light-emitting element layer 130 may be disposed on the circuit layer 120. The light-emitting element layer 130 may include a light-emitting element ED. In an embodiment, for example, the light-emitting element layer 130 may include an organic light-emitting material, an inorganic light-emitting material, an organic-inorganic light-emitting material, a quantum dot, a quantum rod, a micro LED, or a nano LED. Hereinafter, for convenience of description, an embodiment in which the light-emitting element ED is an organic light-emitting element will be described, but the embodiment of the invention is not particularly limited thereto.

The light-emitting element ED may include a first electrode AE, a light-emitting layer EL, and a second electrode CE.

The first electrode AE may be disposed on the sixth insulating layer 60. The first electrode AE may be connected to the second connection electrode CNE2 through a contact hole CNT-3 defined through the sixth insulating layer 60.

A pixel defining film 70 may be disposed on the sixth insulating layer 60 and cover a portion of the first electrode AE. An opening 70-OP is defined in the pixel defining film 70. The opening 70-OP of the pixel defining film 70 exposes at least a portion of the first electrode AE.

The display region DA (see FIG. 4) may include a light-emitting region PXA and a non-light-emitting region NPXA adjacent to the light-emitting region PXA. The non-light-emitting region NPXA may surround the light-emitting region PXA. In this embodiment, the light-emitting region PXA is defined to correspond to a partial region of the first electrode AE exposed by the opening 70-OP.

The light-emitting layer EL may be disposed on the first electrode AE. The light-emitting layer EL may be disposed in a region corresponding to the opening 70-OP. In an embodiment, the light-emitting layer EL may be separately formed in each of the pixels. In such an embodiment where the light-emitting layer EL is separately formed in each of the pixels, each of the light-emitting layers EL may emit light in blue, red, or green. Without being limited thereto, however, the light-emitting layer EL may be connected to the pixels and provided thereto in common in an alternative embodiment. In such an embodiment, the light-emitting layer EL may provide blue light or white light.

The second electrode CE may be disposed on the light-emitting layer EL. The second electrode CE may have an integral shape and be commonly disposed in the plurality of pixels.

Although not illustrated, a hole control layer may be disposed between the first electrode AE and the light-emitting layer EL. The hole control layer may be commonly disposed in the light-emitting region PXA and the non-light-emitting region NPXA. The hole control layer may include a hole transport layer and further include a hole injection layer. An electron control layer may be disposed between the light-emitting layer EL and the second electrode CE. The electron control layer may include an electron transport layer and further include an electron injection layer. The hole control layer and the electron control layer may be commonly formed in the plurality of pixels by using an open mask.

The encapsulation layer 140 may be disposed on the light-emitting element layer 130. The encapsulation layer 140 may include an inorganic layer, an organic layer, and an inorganic layer which are sequentially stacked one on another, but the layers constituting the encapsulation layer 140 are not limited thereto.

The inorganic layers may protect the light-emitting element layer 130 from moisture and oxygen, and the organic layer may protect the light-emitting element layer 130 from foreign substances such as dust particles. The inorganic layers may include a silicon nitride layer, a silicon oxynitride layer, a silicon oxide layer, a titanium oxide layer, an aluminum oxide layer, or the like. The organic layer may include an acrylic-based organic layer, but is not limited thereto.

The sensor layer ISL may include a base layer 150, a first conductive layer 160, a sensing insulating layer 170, a second conductive layer 180, and a cover insulating layer 190.

The base layer 150 may be an inorganic layer including at least one selected from silicon nitride, silicon oxynitride, and silicon oxide. Alternatively, the base layer 150 may be an organic layer including an epoxy resin, an acrylic resin, or an imide-based resin. The base layer 150 may have a single-layered structure or a multi-layered structure stacked along the third direction DR3. According to an alternative embodiment of the invention, the base layer 150 may be omitted.

Each of the first conductive layer 160 and the second conductive layer 180 may have a single-layered structure or a multi-layered structure stacked along the third direction DR3.

The conductive layer having a single-layered structure may include a metal layer or a transparent conductive layer. The metal layer may include molybdenum, silver, titanium, copper, aluminum, or an alloy thereof. The transparent conductive layer may include a transparent conductive oxide such as indium tin oxide (ITO), indium zinc oxide (IZO), zinc oxide (ZnO), or indium zinc tin oxide (IZTO). In addition, the transparent conductive layer may include conductive polymer such as PEDOT, metal nanowire, graphene, and the like.

The conductive layer having a multi-layered structure may include metal layers. The metal layers may have, for example, a three-layer structure of titanium/aluminum/titanium. The conductive layer having a multi-layered structure may include at least one metal layer and at least one transparent conductive layer.

At least one selected from the sensing insulating layer 170 and the cover insulating layer 190 may include an inorganic film. The inorganic film may include at least one selected from aluminum oxide, titanium oxide, silicon oxide, silicon nitride, silicon oxynitride, zirconium oxide, and hafnium oxide.

At least one selected from the sensing insulating layer 170 and the cover insulating layer 190 may include an organic film. The organic film may include at least one selected from an acrylic-based resin, a methacrylic-based resin, polyisoprene, a vinyl-based resin, an epoxy-based resin, a urethane-based resin, a cellulose-based resin, a siloxane-based resin, a polyimide-based resin, a polyamide-based resin, and a perylene-based resin.

The light path control layer OSL may include a plurality of barrier ribs SW and a transmission portion TRP between the plurality of barrier ribs SW. The first-type light-emitting elements EDt1 illustrated in FIG. 5 may not overlap the plurality of barrier ribs SW. In an embodiment of the invention, the first-type light-emitting elements EDt1 may overlap the transmission portion TRP.

The plurality of barrier ribs SW may include a light absorbing material or a light blocking material. In an embodiment, for example, light incident to the plurality of barrier ribs SW may not be reflected and may be absorbed by the plurality of barrier ribs SW. The transmission portion TRP may include a transparent organic material.

A height SW-HT of each of the plurality of barrier ribs SW may be twice or greater a width T-WT of the transmission portion TRP between two adjacent barrier ribs SW among the plurality of barrier ribs SW. In an embodiment, for example, the height SW-HT of each of the plurality of barrier ribs SW and the width T-WT of the transmission portion TRP may satisfy the conditions in the table below. However, they are only examples and may vary depending on a material constituting the transmission portion TRP and a target viewing angle AG.

TABLE 1

| Target viewing angle (AG) | Width T-WT of transmission portion TRP | Height SW-HT of each of the plurality of barrier ribs SW |
|---|---|---|
| 30 degrees | 6 μm | 17.0 μm |
| | 8 μm | 22.6 μm |
| | 10 μm | 28.3 μm |
| 35 degrees | 6 μm | 14.5 μm |
| | 8 μm | 19.3 μm |
| | 10 μm | 24.2 μm |

Figure 8A:
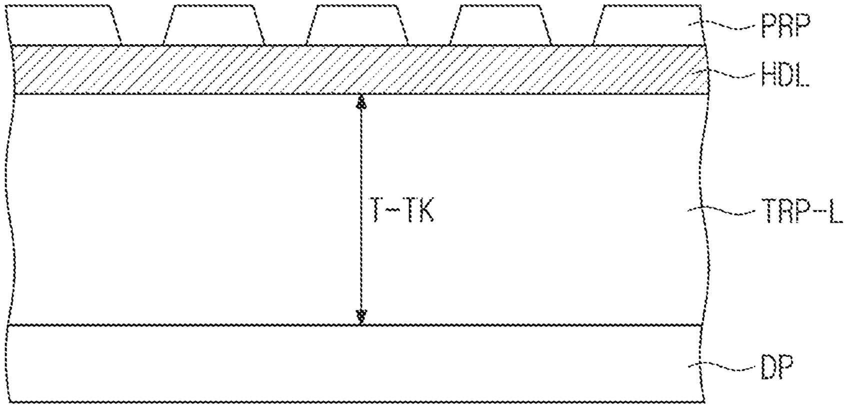
FIGS. 8A to 8D illustrate a method of forming a light path control layer according to an embodiment of the invention.

FIGS. 8A to 8D illustrate a method of forming a light path control layer according to an embodiment of the invention. FIGS. 8A to 8D illustrate a method of forming the light path control layer OSL illustrated in FIG. 7. Referring to FIG. 8A, a transparent organic film TRP-L having a predetermined thickness T-TK or greater is formed on the display panel DP. In an embodiment, for example, the transparent organic film TRP-L may be formed on the front surface of the display panel DP. The predetermined thickness T-TK may be about 20 micrometers, but is not particularly limited thereto. In an embodiment, for example, the thickness of the transparent organic film TRP-L may be changed according to the target viewing angle and the refractive index of the transparent organic film TRP-L. A hard mask HDL is formed on the transparent organic film TRP-L, and a photoresist pattern PRP is formed thereon.

Figure 8B:
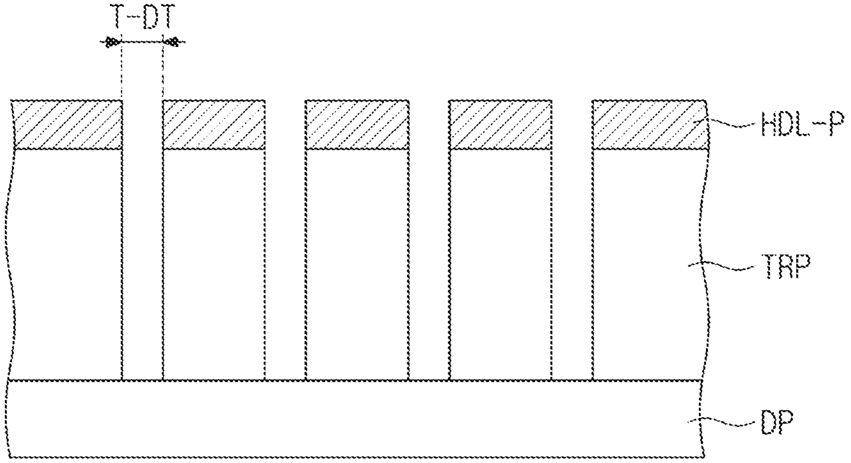

Referring to FIGS. 8A and 8B, the hard mask HDL is patterned by using the photoresist pattern PRP, and the transmission portion TRP is formed by etching the transparent organic film TRP-L using the patterned hard mask HDL-P. In an embodiment, for example, the transparent organic film TRP-L may be dry-etched. A width T-DT between the transmission portions TRP may be approximately 2 micrometers, but is not particularly limited thereto. The width T-DT may be changed based on the target viewing angle and the thickness of the transmission portion TRP.

Figure 8C:
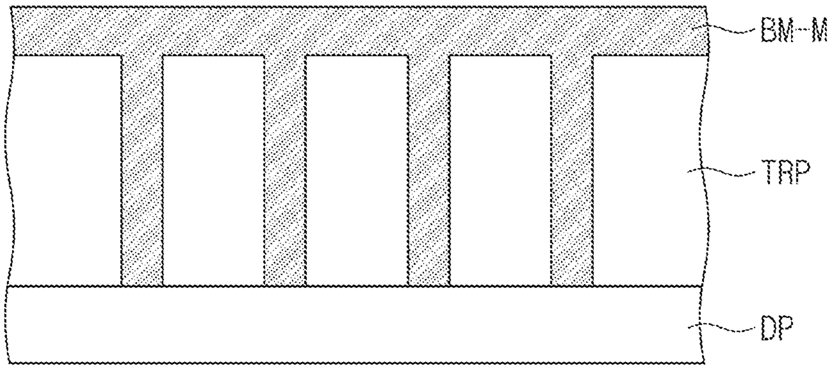

Referring to FIGS. 8B and 8C, the hard mask HDL-P remaining on the transmission portion TRP may be removed. Hereafter, a light absorbing material BM-M may be coated on the transmission portion TRP to fill a space between the transmission portions TRP. The light absorbing material BM-M may be an organic material.

Figure 8D:
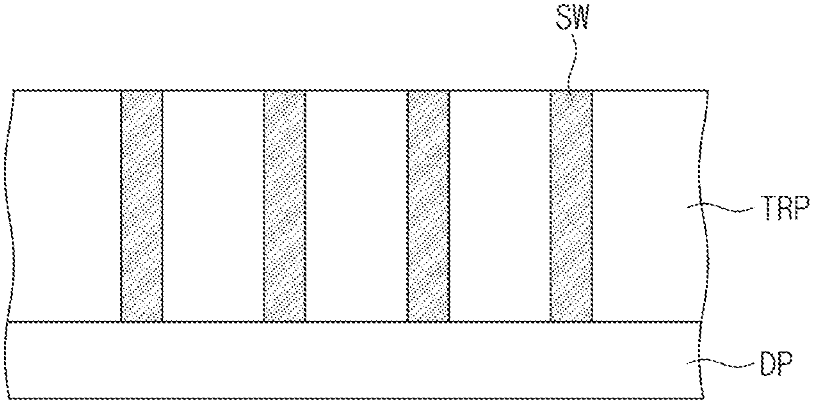

Referring to FIGS. 8C and 8D, at least a portion of the light absorbing material BM-M disposed on the transmission portion TRP may be removed to form the barrier rib SW. In an embodiment, for example, at least a portion of the light absorbing material BM-M may be removed through a chemical mechanical polishing process.

Figure 9:
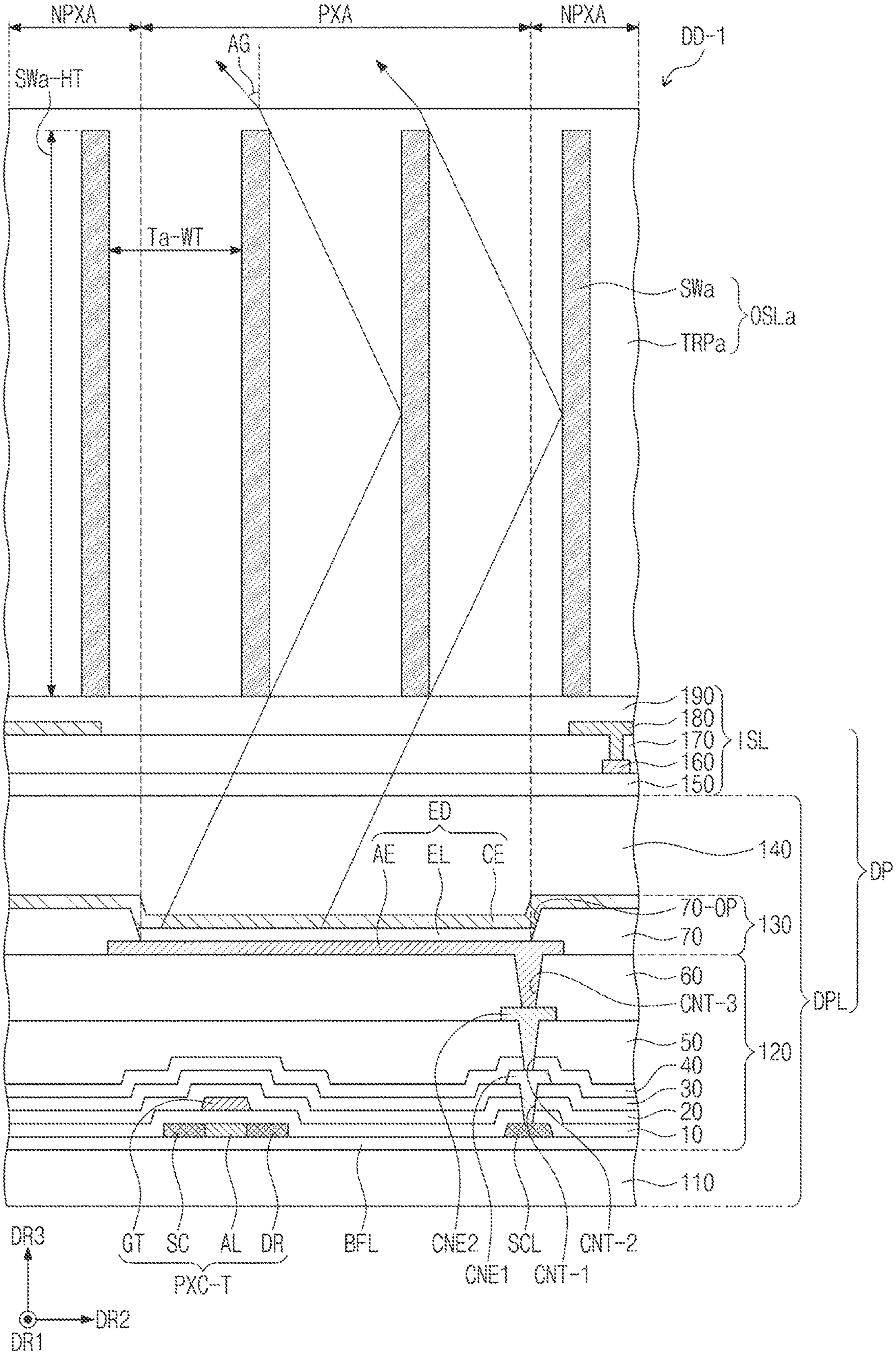
FIG. 9 is a cross-sectional view of a display device according to an embodiment of the invention.

FIG. 9 is a cross-sectional view of a display device DD-1 according to an embodiment of the invention.

Referring to FIG. 9, a light path control layer OSLa may include a plurality of barrier ribs SWa and a transmission portion TRPa between the plurality of barrier ribs SWa. The first-type light-emitting elements EDt1 illustrated in FIG. 5 may not overlap the plurality of barrier ribs SWa. In an embodiment of the invention shown in FIG. 9, the first-type light-emitting elements EDt1 may overlap the transmission portion TRPa.

The plurality of barrier ribs Swa may include a low reflection material. The reflectivity of the plurality of barrier ribs Swa may be in a range of about 0% to about 10%. Each of the plurality of barrier ribs Swa may be formed of a multi-layered film. In an embodiment, for example, each of the plurality of barrier ribs Swa may include a semi-transmissive film/a reflective film/a semi-transmissive film, which may be stacked in the second direction DR2. In an embodiment, for example, each of the plurality of barrier ribs Swa may have a multi-layered structure of MTO/Mo/MTO, but the embodiment of the invention is not particularly limited thereto. A height Swa-HT of the plurality of barrier ribs Swa illustrated in FIG. 9 may be three times or greater a width Ta-WT of the transmission portion TRPa between two adjacent barrier ribs Swa among the plurality of barrier ribs Swa. Since the barrier ribs Swa includes a low reflection material, the barrier ribs Swa may have the height Swa-HT greater than the height SW-HT of the barrier rib SW in the embodiment described above with reference to FIG. 7. In an embodiment, for example, the height of the plurality of barrier ribs Swa may be set to be about twice the height SW-HT of the barrier rib Swa in consideration of double reflection.

FIGS. 10A to 10E illustrate a method of forming a light path control layer according to an embodiment of the invention. FIGS. 10A to 10E illustrate a method of forming the light path control layer OSLa illustrated in FIG. 9.

Figure 10A:
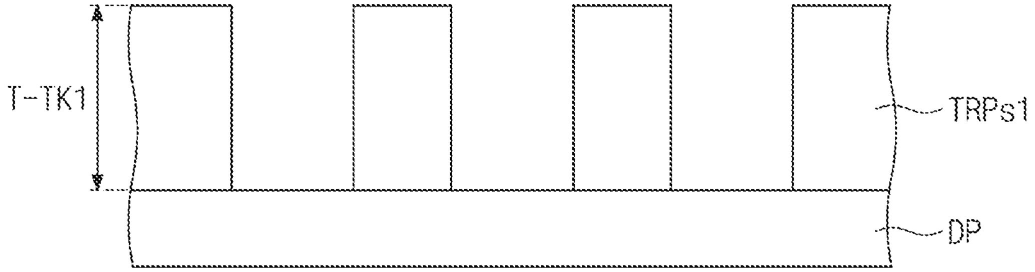
FIGS. 10A to 10E illustrate a method of forming a light path control layer according to an embodiment of the invention.

Referring to FIG. 10A, a first transmission portion TRPs1 having a first thickness T-TK1 is formed on the display panel DP. The first transmission portion TRPs1 may be formed through substantially the same process as that described above in FIGS. 8A and 8B.

Figure 10B:
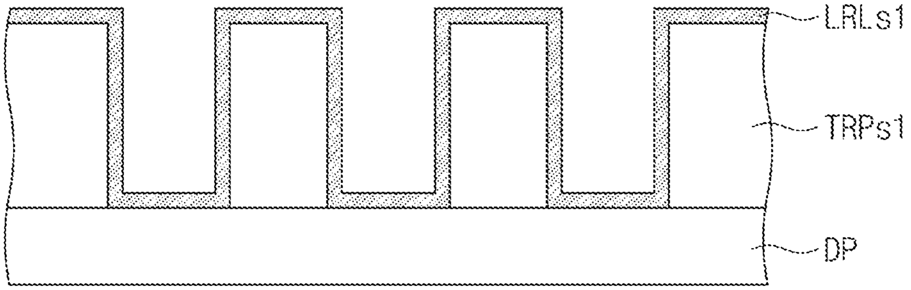

Referring to FIG. 10B, a first low reflection layer LRLs1 is deposited on the first transmission portion TRPs1. The first low reflection film LRLs1 may be formed of a multi-layered film, and for example, a semi-transmissive film/a reflective film/a semi-transmissive film may be sequentially deposited.

Figure 10C:
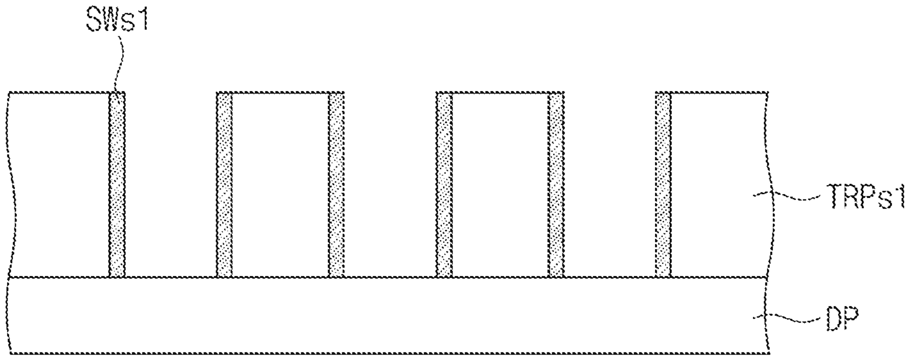

Referring to FIGS. 10B and 10C, at least a portion of the first low reflection layer LRLs1 may be etched to form first barrier ribs SWs1. In an embodiment, for example, at least a portion of the first low reflection layer LRLs1 may be dry-etched.

Figure 10D:
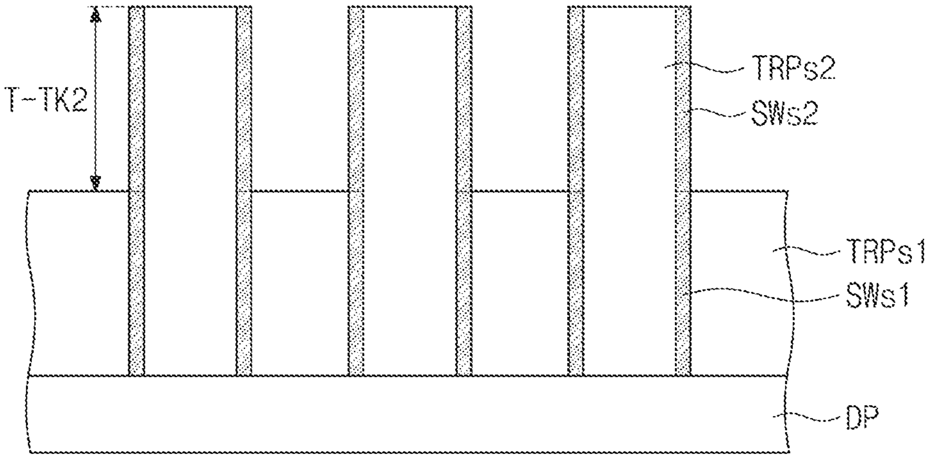

Referring to FIGS. 10C and 10D, a second transmission portion TRPs2 is disposed in a space between the first barrier ribs SWs1. The second transmission portion TRPs2 may protrude more (or further upwardly) than the first transmission portion TRPs1. The second transmission portion TRPs2 may protrude more than the first transmission portion TRPs1 by a second thickness T-TK2.

Figure 10E:
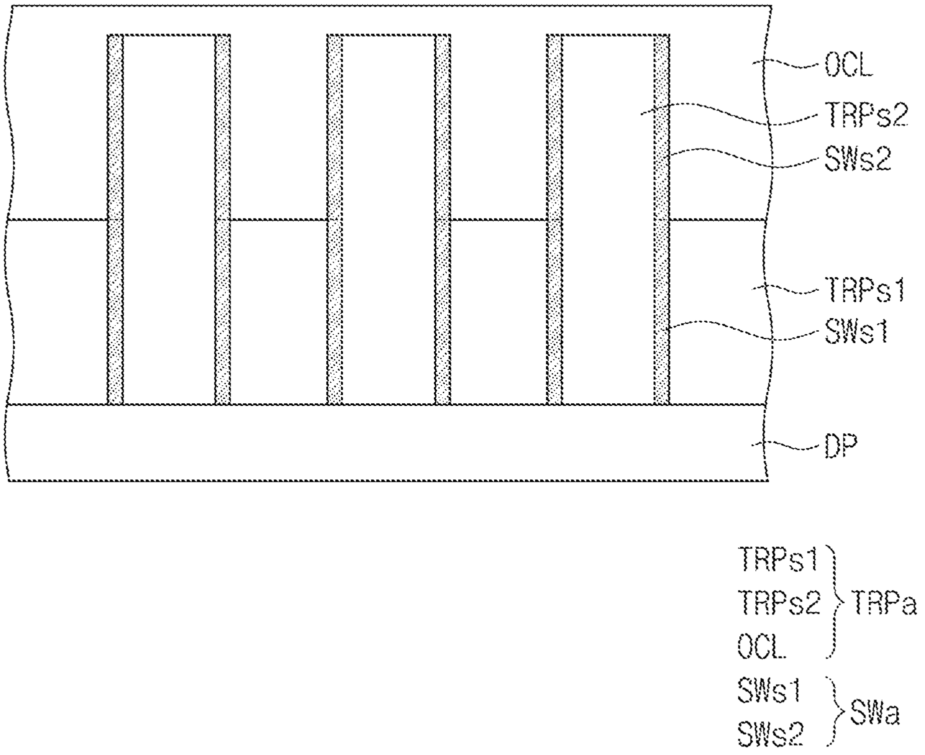

Hereafter, the processes of FIGS. 10B and 10C may be repeated on the second transmission portion TRPs2 to form second barrier ribs SWs2. Since the first barrier rib SWs1 and the second barrier rib SWs2 are formed through a separate process, the first barrier rib SWs1 and the second barrier rib SWs2 may not be perfectly aligned with each other and may be aligned within a predetermined error range. Referring to FIG. 10E, an overcoating layer OCL is formed to cover the first transmission portion TRPs1, the second transmission portion TRPs2, the first barrier ribs SWs1, and the second barrier ribs SWs2. The first transmission portion TRPs1, the second transmission portion TRPs2, and the overcoating layer OCL may include a same material as each other, for example, a transparent organic material. Accordingly, the boundaries between the first transmission portion TRPs1, the second transmission portion TRPs2, and the overcoating layer OCL may not be viewed or visually recognized.

Referring to FIGS. 9 and 10E, each of the plurality of barrier ribs SWa may include a first barrier rib SWs1 and a second barrier rib SWs2, and the transmission portion TRPa may include a first transmission portion TRPs1, a second transmission portion TRPs2, and an overcoating layer OCL. In order to form the plurality of barrier ribs SWa having the height SWa-HT equal to or greater than a height that can be implemented in a process, the plurality of barrier ribs SWa may be formed through a plurality of repetitive processes. FIGS. 10A to 10E illustrate a case where the process is repeated twice, but the embodiment of the invention is not particularly limited thereto. In an embodiment, for example, each of the plurality of barrier ribs SWa may be formed through three or more processes.

Figure 11:
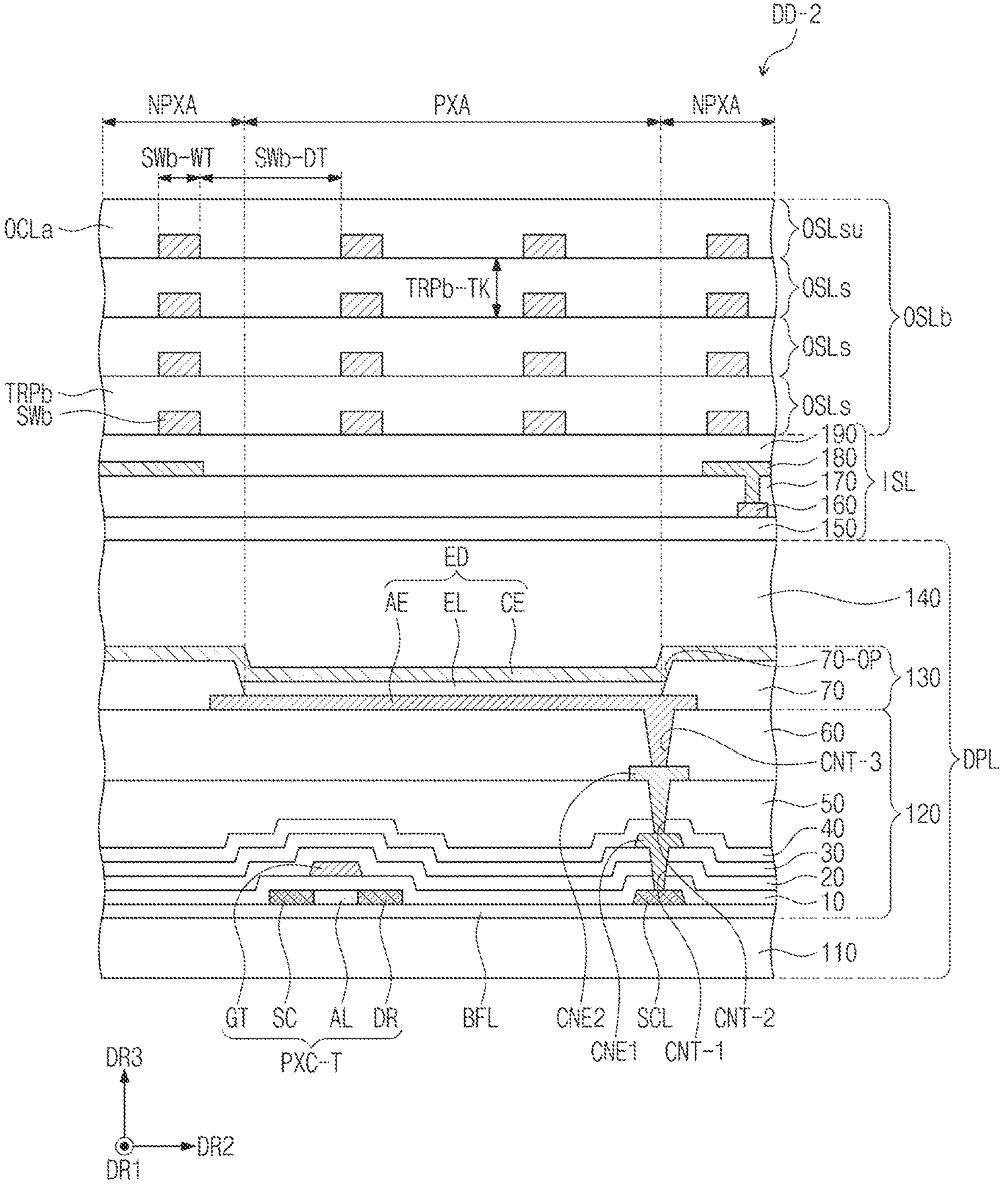
FIG. 11 is a cross-sectional view of a display device according to an embodiment of the invention.

FIG. 11 is a cross-sectional view of a display device DD-2 according to an embodiment of the invention.

Referring to FIG. 11, a light path control layer OSLb may include a plurality of sub-light path control layers OSLs and OSLsu. FIG. 11 illustrates an embodiment where the light path control layer OSLb includes four sub-light path control layers OSLs and OSLsu, but the embodiment of the invention is not particularly limited thereto.

The plurality of sub-light path control layers OSLs and OSLsu may be sequentially stacked in a direction away from the light-emitting element ED. Among the sub-light path control layers OSLs and OSLsu, the uppermost sub-light path control layer OSLsu disposed on the top may include a plurality of barrier ribs SWb and an overcoating layer OCLa covering the barrier ribs SWb. Each of the remaining three sub-light path control layers OSLs may include a plurality of barrier ribs SWb and a transmission layer TRPb covering the barrier ribs SWb. The plurality of barrier ribs SWb may include a light absorbing material or a light blocking material. In an embodiment, for example, light incident to the plurality of barrier ribs SWb may not be reflected and may be absorbed by the plurality of barrier ribs SWb. The overcoat layer OCLa and the transmission layer TRPb may include a transparent organic material.

In such an embodiment, the number of the sub-light path control layers OSLs and OSLsu included in the light path control layer OSLb, a distance SWb-DT between the plurality of barrier ribs SWb, a width SWb-WT of each of the barrier ribs SWb, or a thickness TRPb-TK of the transmission layer TRPb may be controlled based on the target viewing angle.

Table 2 below lists the conditions of the light path control layer OSLb when the luminance at a viewing angle of about 30 degrees satisfies the condition of less than 1% of the maximum luminance. Hereinafter, the number of the layers of the plurality of barrier ribs SWb refers to the number of the layers of the plurality of barrier ribs SWb included in the light path control layer OSLb and stacked along the third direction DR3. The number of the transmission layers TRPb refers to the number of the transmission layers TRPb included in the light path control layer OSLb and stacked along the third direction DR3. That is, in FIG. 5, the number of the layers of the plurality of barrier ribs SWb is 4 and the number of the transmission layers TRPb is 3.

TABLE 2

| Distance SWb-DT between barrier ribs SWb | Width SWb-WT of each of barrier ribs SWb | Total thickness of transmission layers TRPb | Thickness TRPb-TK of one transmission layer TRPb * Number of transmission layers TRPb | Number of layers of barrier ribs SWb |
|---|---|---|---|---|
| 10 μm | 3 μm | 20 μm | 4.00 μm * 5 | 6 |
| 10 μm | 4 μm | 15 μm | 3.75 μm * 4 | 5 |
| 15 μm | 3 μm | 34 μm | 4.25 μm * 8 | 9 |
| 15 μm | 4 μm | 31 μm | 5.17 μm * 6 | 7 |
| 20 μm | 3 μm | 48 μm | 5.33 μm * 9 | 10 |
| 20 μm | 4 μm | 45 μm | 6.43 μm * 7 | 8 |
| 30 μm | 6 μm | 68 μm | 9.71 μm * 7 | 8 |
| 30 μm | 8 μm | 62 μm | 10.33 μm * 6 | 7 |
| 30 μm | 10 μm | 57 μm | 11.40 μm * 5 | 6 |
| 30 μm | 12 μm | 48 μm | 12.00 μm * 4 | 5 |
| 40 μm | 8 μm | 90 μm | 11.25 μm * 8 | 9 |
| 40 μm | 10 μm | 85 μm | 14.17 μm * 6 | 7 |
| 40 μm | 12 μm | 75 μm | 15.00 μm * 5 | 6 |
| 40 μm | 14 μm | 70 μm | 14.00 μm * 5 | 6 |
| 40 μm | 16 μm | 65 μm | 16.25 μm * 4 | 5 |
| 45 μm | 12 μm | 88 μm | 14.67 μm * 6 | 7 |
| 45 μm | 14 μm | 83 μm | 16.60 μm * 5 | 6 |
| 45 μm | 16 μm | 78 μm | 19.50 μm * 4 | 5 |

Figure 12:
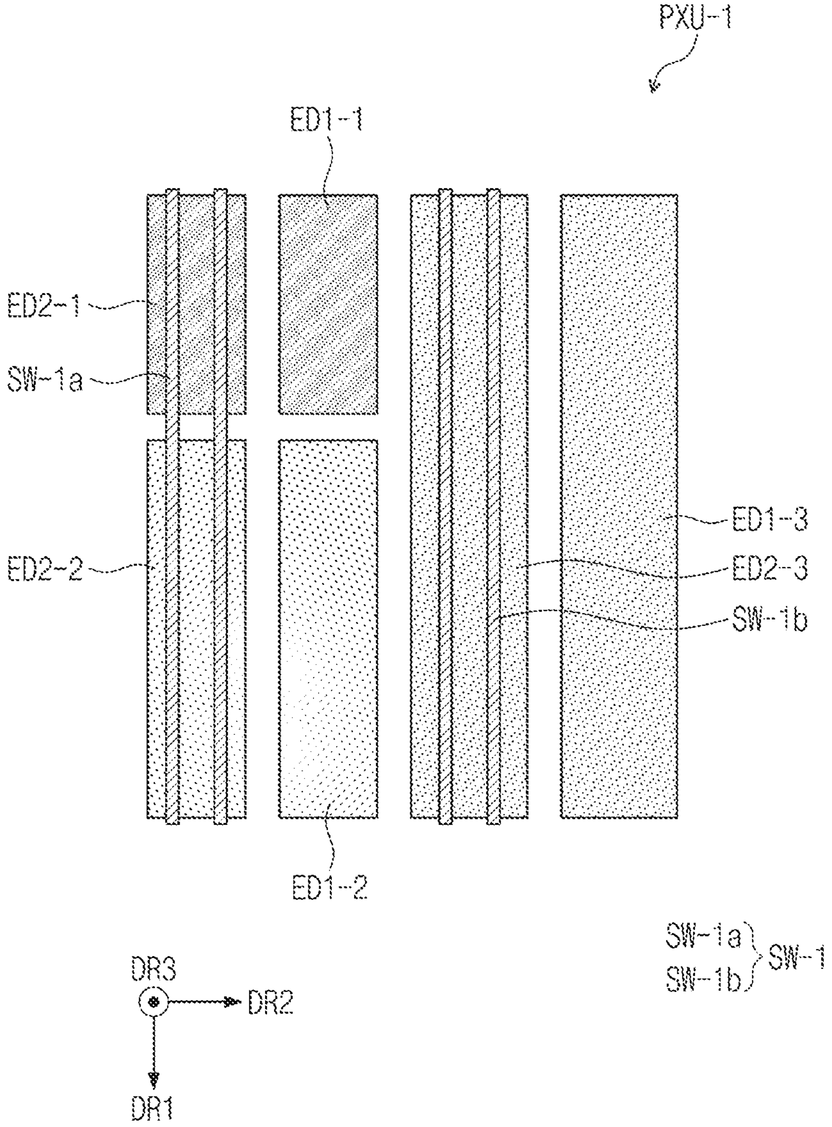
FIG. 12 is an enlarged plan view of a portion of a display device according to an embodiment of the invention.

FIG. 12 is an enlarged plan view of a portion of a display device according to an embodiment of the invention.

Referring to FIG. 12, one pixel unit PXU-1 is representatively illustrated. The pixel unit PXU-1 illustrated in FIG. 12 may be repeatedly arranged along the first and second directions DR1 and DR2.

The first first-type light-emitting element ED1-1 and the first second-type light-emitting element ED2-1 may be arranged to be spaced apart from each other in the second direction DR2, the second first-type light-emitting element ED1-2 and the second second-type light-emitting element ED2-2 may be arranged to be spaced apart from each other in the second direction DR2, and the third first-type light-emitting element ED1-3 and the third second-type light-emitting element ED2-3 may be arranged to be spaced apart from each other in the second direction DR2. The first first-type light-emitting element ED1-1 may be arranged to be spaced apart from the second first-type light-emitting element ED1-2 in the first direction DR1, and the first second-type light-emitting element ED2-1 may be arranged to be spaced apart from the second second-type light-emitting element ED2-2 in the first direction DR1.

A plurality of barrier ribs SW-1 may include a first barrier rib SW-la extending in the first direction DR1 and overlapping both the first second-type light-emitting element ED2-1 and the second second-type light-emitting element ED2-2. The plurality of barrier ribs SW-1 may further include a second barrier rib SW-lb extending in the first direction DR1 and overlapping the third second-type light-emitting element ED2-3. In such an embodiment of the invention, each of the first barrier rib SW-la and the second barrier rib SW-lb may overlap a plurality of pixel units repeatedly arranged along the second direction DR2.

Figure 13:
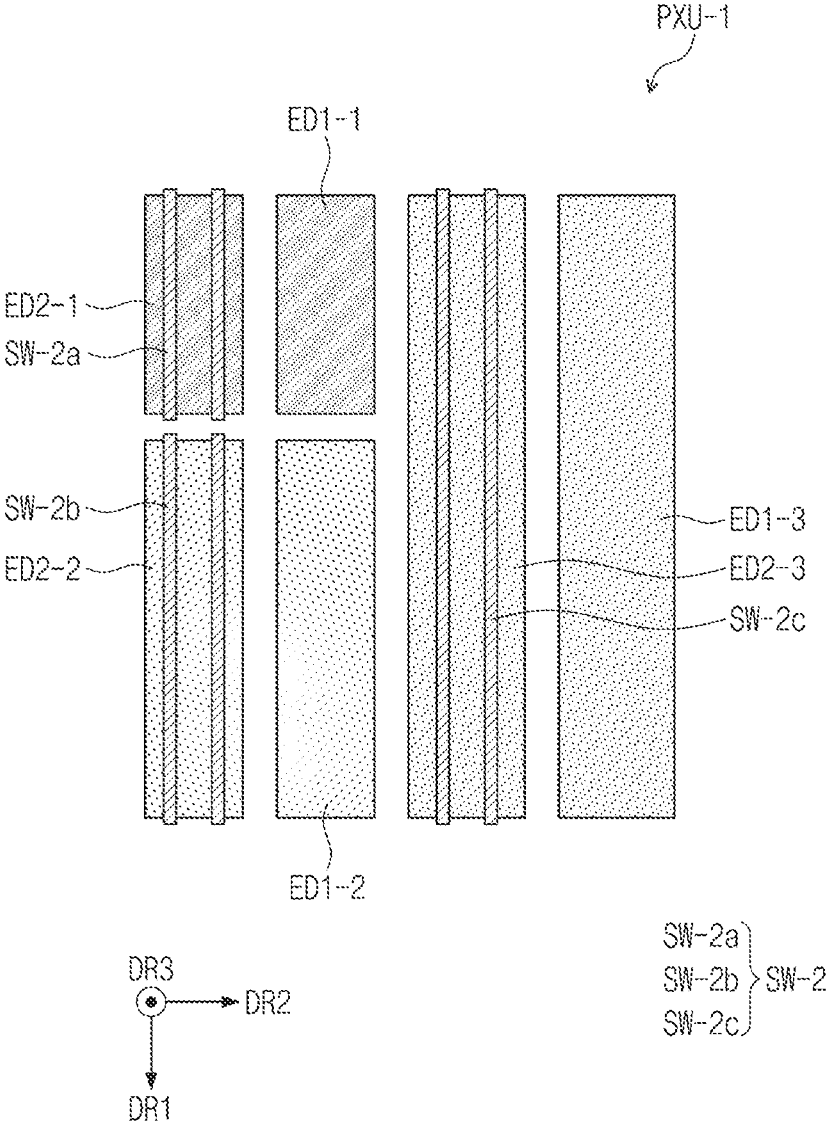
FIG. 13 is an enlarged plan view of a portion of a display device according to an embodiment of the invention.

FIG. 13 is an enlarged plan view of a portion of a display device according to an embodiment of the invention.

Referring to FIG. 13, a plurality of barrier ribs SW-2 may include a first barrier rib SW-2*a* extending in the first direction DR1 and overlapping the first second-type light-emitting element ED2-1, a second barrier rib SW-2*b* extending in the first direction DR1, spaced apart from the first barrier rib SW-2*a*, and overlapping the second second-type light-emitting element ED2-2, and a third barrier rib SW-2*c* extending in the first direction DR1 and overlapping the third second-type light-emitting element ED2-3.

Figure 14:
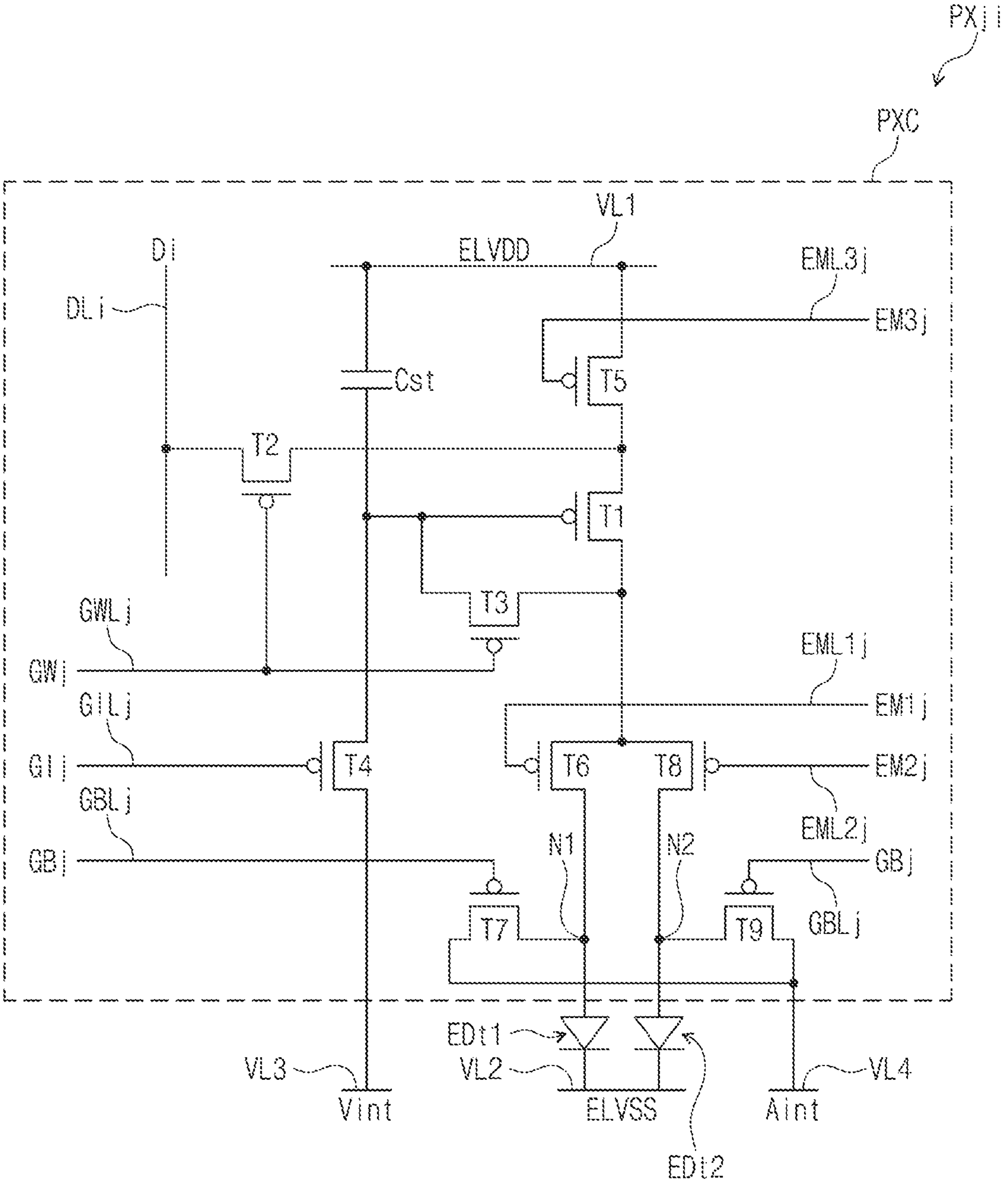
FIG. 14 is a circuit diagram of a pixel according to an embodiment of the invention.

FIG. 14 is a circuit diagram of a pixel PXji according to an embodiment of the invention.

Referring to FIGS. 4 and 14, the pixel PXji may be connected to a j-th initialization scan line GILj, a j-th black scan line GBLj, a j-th write scan line GWLj, a j-th first light-emitting control line EML1*j*, a j-th second light-emitting control line EML2*j*, a j-th third light-emitting control line EML3*j*, and an i-th data line DLi. Here, i is a positive integer less than or equal to n, and j is a positive integer less than or equal to m. Each of the plurality of pixels PX illustrated in FIG. 4 may have the same circuit configuration as the pixel PXji illustrated in FIG. 14.

The pixel PXji according to an embodiment of the invention may include a pixel driving circuit PXC, a first-type light-emitting element EDt1, and a second-type light-emitting element EDt2. The pixel driving circuit PXC may include first to ninth transistors T1, T2, T3, T4, T5, T6, T7, T8, and T9 and a capacitor Cst.

Each of the first to ninth transistors T1, T2, T3, T4, T5, T6, T7, T8, and T9 may be a P-type thin-film transistor having a silicon semiconductor layer, for example, a low-temperature polycrystalline silicon (LTPS) semiconductor layer. However, the embodiment of the invention is not limited thereto, and some of the first to ninth transistors T1, T2, T3, T4, T5, T6, T7, T8, and T9 may be N-type thin-film transistors having an oxide semiconductor as a semiconductor layer, the remainder may be P-type transistors. In an alternative embodiment, all of the first to ninth transistors T1, T2, T3, T4, T5, T6, T7, T8, and T9 may be N-type transistors.

The j-th initial scan line GILj may transmit a initialization scan signal GIj, the j-th black scan line GBLj may transmit a black scan signal GBj, the j-th write scan line GWLj may transmit a write scan signal GWj, the j-th first light-emitting control line EML1*j* may transmit a first light-emitting control signal EM1*j*, the j-th second light-emitting control line EML2*j* may transmit a second light-emitting control signal EM2*j*, the j-th third light-emitting control line EML3*j* may transmit a third light-emitting control signal EM3*j*, and the i-th data line DLi may transmit a data signal Di. The data signal Di may have a voltage level corresponding to the grayscale value of the image data signal DATA output from the driving controller 100.

In addition, the pixel PXji may be connected to first to fourth driving voltage lines VL1, VL2, VL3, and VL4. The first driving voltage line VL1 may transmit the first driving voltage ELVDD. The second driving voltage line VL2 may transmit the second driving voltage ELVSS. The third driving voltage line VL3 may transmit the first initialization voltage Vint and be referred to as a first initialization voltage line. The fourth driving voltage line VL4 may transmit the second initialization voltage Aint and be referred to as a second initialization voltage line.

The first transistor T1 includes a first electrode electrically connected to the first driving voltage line VL1 via the fifth transistor T5, a second electrode electrically connected to the anode of the first-type light-emitting element EDt1 via the sixth transistor T6 or electrically connected to the anode of the second-type light-emitting element EDt2 via the eighth transistor T8, and a gate electrode. The first transistor T1 may be referred to as a driving transistor.

The second transistor T2 may be connected between the first electrode of the first transistor T1 and the data line DLi. The second transistor T2 includes a first electrode connected to the data line DLi, a second electrode connected to the first electrode of the first transistor T1, and a gate electrode connected to the j-th write scan line GWLj. The second transistor T2 may be turned on in response to the write scan signal GWj received through the j-th write scan line GWLj and then transmit the data signal Di, which is transmitted from the data line DLi, to the first transistor T1. The second transistor T2 may be referred to as a switching transistor.

The capacitor Cst may be connected between the gate electrode of the first transistor T1 and the first driving voltage line VL1.

The third transistor T3 includes a first electrode connected to the second electrode of the first transistor T1, a second electrode connected to the gate electrode of the first transistor T1, and a gate electrode connected to the j-th write scan line GWLj. The third transistor T3 may be turned on in response to the write scan signal GWj and connect the gate electrode of the first transistor T1 and the second electrode of the first transistor T1 to each other.

The fourth transistor T4 includes a first electrode connected to the gate electrode of the first transistor T1, a second electrode connected to the third driving voltage line VL3, and a gate electrode connected to the j-th initialization scan line GILj. The fourth transistor T4 may be turned on in response to the initialization scan signal GIj received through the j-th initialization scan line GILj and transmit the first initialization voltage Vint to the gate electrode of the first transistor T1, thereby initializing the voltage of the gate electrode of the first transistor T1.

The fifth transistor T5 may be connected between the first electrode of the first transistor T1 and the first driving voltage line VL1. The fifth transistor T5 includes a first electrode connected to the first driving voltage line VL1, a second electrode connected to the first electrode of the first transistor T1, and a gate electrode connected to the j-th third light-emitting control line EML3*j*. The fifth transistor T5 may be turned on in response to the third light-emitting control signal EM3*j* received through the j-th third light-emitting control line EML3*j*. The fifth transistor T5 may be referred to as a third light-emitting control transistor.

The sixth transistor T6 may be connected between the second electrode of the first transistor T1 and the first-type light-emitting element EDt1. The sixth transistor T6 includes a first electrode connected to the second electrode of the first transistor T1, a second electrode connected to the anode of the first-type light-emitting element EDt1, and a gate electrode connected to the j-th first light-emitting control line EML1*j*. The sixth transistor T6 may be turned on in response to the first light-emitting control signal EMU received through the j-th first light-emitting control line EML1*j*. The sixth transistor T6 may be referred to as a first light-emitting control transistor.

The seventh transistor T7 may be connected between the fourth driving voltage line VL4 and a first node N1 between (or connected to) the sixth transistor T6 and the first-type light-emitting element EDt1. The seventh transistor T7 includes a first electrode connected to the anode of the first-type light-emitting element EDt1, a second electrode connected to the fourth driving voltage line VL4, and a gate electrode connected to the j-th black scan line GBLj. The seventh transistor T7 may be turned on in response to the black scan signal GBj received through the j-th black scan line GBLj and connect the fourth driving voltage line VL4, to which the second initialization voltage Aint is provided, and the first-type light-emitting element EDt1 to each other. The black scan signal GBj may be referred to as an initialization transmission signal GBj, and the seventh transistor T7 may be referred to as a first initialization transistor.

The eighth transistor T8 may be connected between the second electrode of the first transistor T1 and the second-type light-emitting element EDt2. The eighth transistor T8 includes a first electrode connected to the second electrode of the first transistor T1, a second electrode connected to the anode of the second-type light-emitting element EDt2, and a gate electrode connected to the j-th second light-emitting control line EML2*j*. The eighth transistor T8 may be turned on in response to the second light-emitting control signal EM2*j* received through the j-th second light-emitting control line EML2*j*. The eighth transistor T8 may be referred to as a second light-emitting control transistor.

The ninth transistor T9 may be connected between the fourth driving voltage line VL4 and a second node N2 between (or connected to) the eighth transistor T8 and the second-type light-emitting element EDt2. The ninth transistor T9 includes a first electrode connected to the anode of the second-type light-emitting element EDt2, a second electrode connected to the fourth driving voltage line VL4, and a gate electrode connected to the j-th black scan line GBLj. The ninth transistor T9 may be turned on in response to the black scan signal GBj received through the j-th black scan line GBLj and connect the fourth driving voltage line VL4, to which the second initialization voltage Aint is provided, and the second-type light-emitting element EDt2 to each other. The black scan signal GBj may be referred to as an initialization transmission signal GBj, and the ninth transistor T9 may be referred to as a second initialization transistor.

In an embodiment of the invention, when the fifth transistor T5 and the sixth transistor T6 are turned on, a current path may be formed between the first driving voltage line VL1 and the first-type light-emitting element EDt1 through the fifth transistor T5, the first transistor T1, and the sixth transistor T6. In such an embodiment, when the fifth transistor T5 and the eighth transistor T8 are turned on, a current path may be formed between the first driving voltage line VL1 and the second-type light-emitting element EDt2 through the fifth transistor T5, the first transistor T1, and the eighth transistor T8.

The first-type light-emitting element EDt1 and the second-type light-emitting element EDt2 connected to and controlled by one pixel driving circuit PXC may emit light of substantially a same color as each other. The cathode of the first-type light-emitting element EDt1 and the cathode of the second-type light-emitting element EDt2 may be electrically connected to the second driving voltage line VL2 to which the second driving voltage ELVSS different from the first driving voltage ELVDD is applied.

Figure 15A:
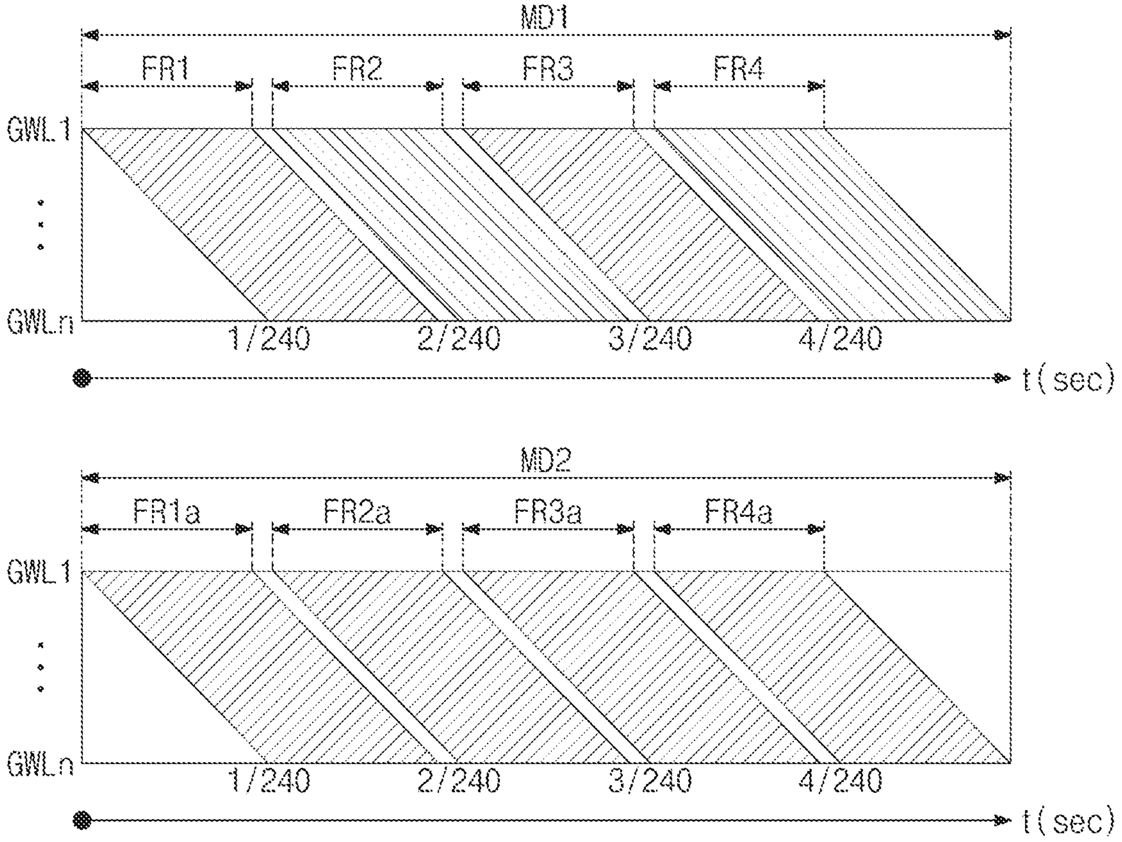
FIG. 15A describes an operation of the pixel according to an embodiment of the invention.

FIG. 15A describes an operation of the pixel according to an embodiment of the invention.

Referring to FIGS. 14 and 15A, the pixel driving circuit PXC may be configured to selectively operate in one of a first mode MD1 and a second mode MD2. In an embodiment, for example, the first mode MD1 may be a normal display mode, and the second mode MD2 may be a viewing angle control mode.

In the first mode MD1, the first-type light-emitting element EDt1 and the second-type light-emitting element EDt2 may alternately emit light in a time-division manner. In an embodiment, for example, the second-type light-emitting element EDt2 may emit light in a first frame FR1 and a third frame FR3, and the first-type light-emitting element EDt1 may emit light in a second frame FR2 and a fourth frame FR4.

The fifth transistor T5 and the eighth transistor T8 may be activated in the first frame FR1 and the third frame FR3, and accordingly, the light emission of the second-type light-emitting element EDt2 may be controlled. The fifth transistor T5 and the sixth transistor T6 may be activated in the second frame FR2 and the fourth frame FR4, and accordingly, the light emission of the first-type light-emitting element EDt1 may be controlled.

The turn-on timings of the fifth transistor T5, the sixth transistor T6, and the eighth transistor T8 may be different from each other. Accordingly, the waveform of the first light-emitting control signal EM1*j*, the waveform of the second light-emitting control signal EM2*j*, and the waveform of the third light-emitting control signal EM3*j* may be different from each other.

In the second mode MD2, the first-type light-emitting element EDt1 may not emit light, and only the second-type light-emitting element EDt2 may emit light. The fifth transistor T5 and the eighth transistor T8 may be activated in a plurality of frames FR1*a*, FR2*a*, FR3*a*, and FR4*a* of the second mode MD2, and accordingly, the light emission of the second-type light-emitting element EDt2 may be controlled. The second-type light-emitting element EDt2 overlaps the barrier ribs SW (see FIG. 5) included in the light path control layer OSL (see FIG. 3A). Accordingly, the viewing angle of light emitted from the second-type light-emitting element EDt2 may be limited by the barrier ribs SW (see FIG. 5).

The driving frequency of each of the plurality of frames FR1, FR2, FR3, and FR4 in the first mode MD1 and the driving frequency of each of the plurality of frames FR1*a*, FR2*a*, FR3*a*, and FR4*a* in the second mode MD2 may be identical to each other. However, the embodiment of the invention is not particularly limited thereto. In an embodiment, for example, the driving frequency in the first mode MD1 may be higher than the driving frequency in the second mode MD2 to prevent flicker recognition in the first mode MD1 driven in a time-division manner. Although FIG. 15A illustrates an embodiment where the driving frequency is about 240 hertz (Hz) in each of the first mode MD1 and the second mode MD2, the driving frequency may be variously changed to about 480 Hz, 120 Hz, 60 Hz, or the like.

Figure 15B:
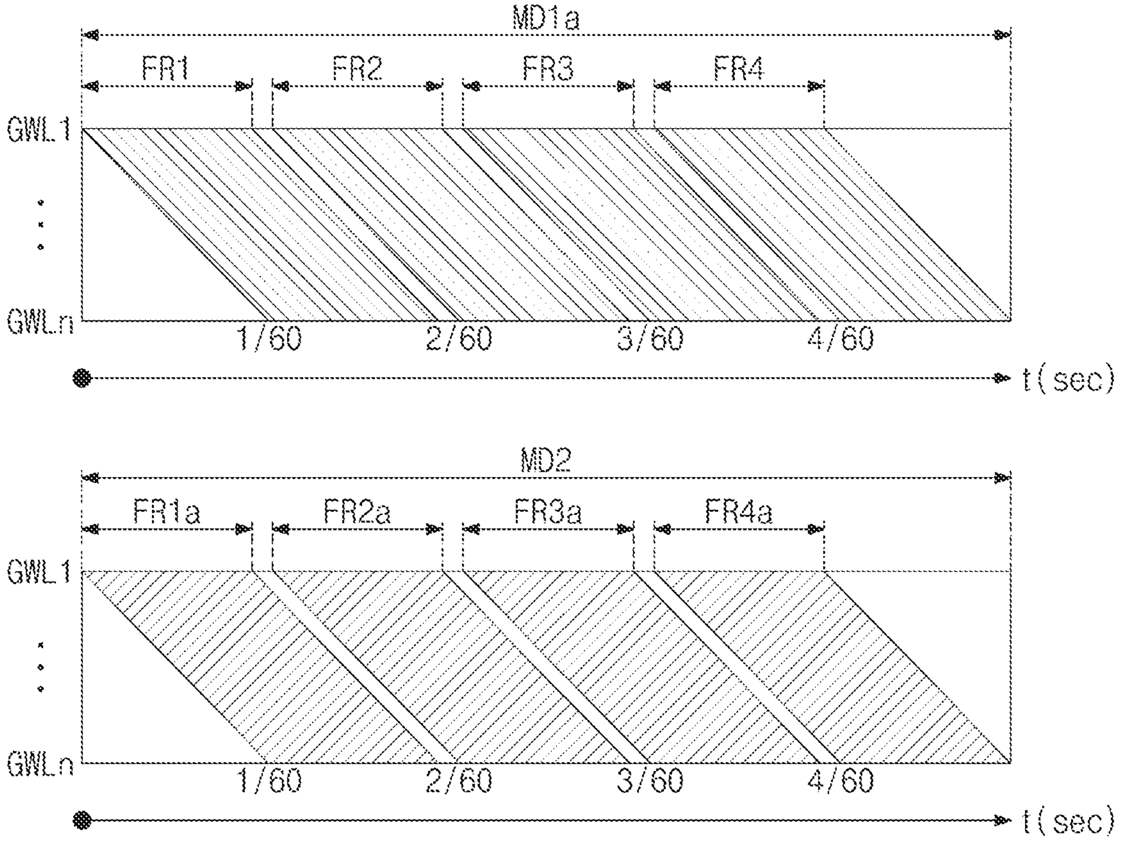
FIG. 15B describes an operation of the pixel according to an embodiment of the invention.

FIG. 15B describes an operation of the pixel according to an embodiment of the invention.

Referring to FIGS. 14 and 15B, the pixel driving circuit PXC may be configured to selectively operate in one of a first mode MD1*a* and a second mode MD2. In the first mode MD1*a*, only the first-type light-emitting element EDt1 may emit light, and the second-type light-emitting element EDt2 may not emit light. In the second mode MD2, the first-type light-emitting element EDt1 may not emit light, and only the second-type light-emitting element EDt2 may emit light.

The fifth transistor T5 and the sixth transistor T6 may be activated in the plurality of frames FR1, FR2, FR3, and FR4 of the first mode MD1*a*, and accordingly, the light emission of the first-type light-emitting element EDt1 may be controlled. The fifth transistor T5 and the eighth transistor T8 may be activated in the plurality of frames FR1*a*, FR2*a*, FR3*a*, and FR4*a* of the second mode MD2, and accordingly, the light emission of the second-type light-emitting element EDt2 may be controlled.

The driving frequency of each of the plurality of frames FR1, FR2, FR3, and FR4 in the first mode MD1*a* and the driving frequency of each of the plurality of frames FR1*a*, FR2*a*, FR3*a*, and FR4*a* in the second mode MD2 may be identical to each other. Although FIG. 15B illustrates an embodiment where the driving frequency is about 60 Hz in each of the first mode MD1*a* and the second mode MD2, the driving frequency may be variously changed to about 480 Hz, 240 Hz, 120 Hz, or the like.

Figure 15C:
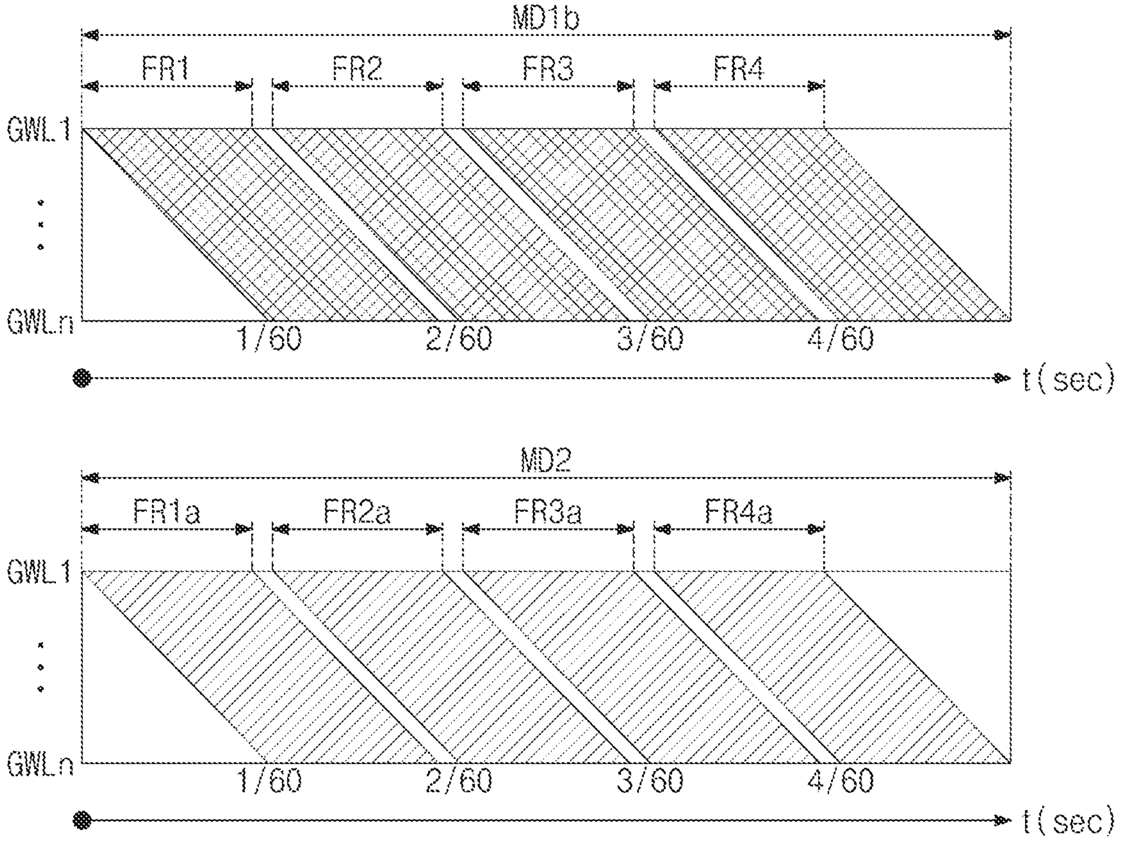
FIG. 15C describes an operation of the pixel according to an embodiment of the invention.

FIG. 15C describes an operation of the pixel according to an embodiment of the invention.

Referring to FIGS. 14 and 15C, the pixel driving circuit PXC may be configured to selectively operate in one of a first mode MD1*b* and a second mode MD2. In the first mode MD1*b*, both the first-type light-emitting element EDt1 and the second-type light-emitting element EDt2 may emit light. In the second mode MD2, the first-type light-emitting element EDt1 may not emit light, and only the second-type light-emitting element EDt2 may emit light.

The fifth transistor T5, the sixth transistor T6, and the eighth transistor T8 may be activated in the plurality of frames FR1, FR2, FR3, and FR4 of the first mode MD1*b*, and accordingly, the light emission of the first-type light-emitting element EDt1 and the second-type light-emitting element EDt2 may be controlled. The fifth transistor T5 and the eighth transistor T8 may be activated in the plurality of frames FR1*a*, FR2*a*, FR3*a*, and FR4*a* of the second mode MD2, and accordingly, the light emission of the second-type light-emitting element EDt2 may be controlled.

Figure 16:
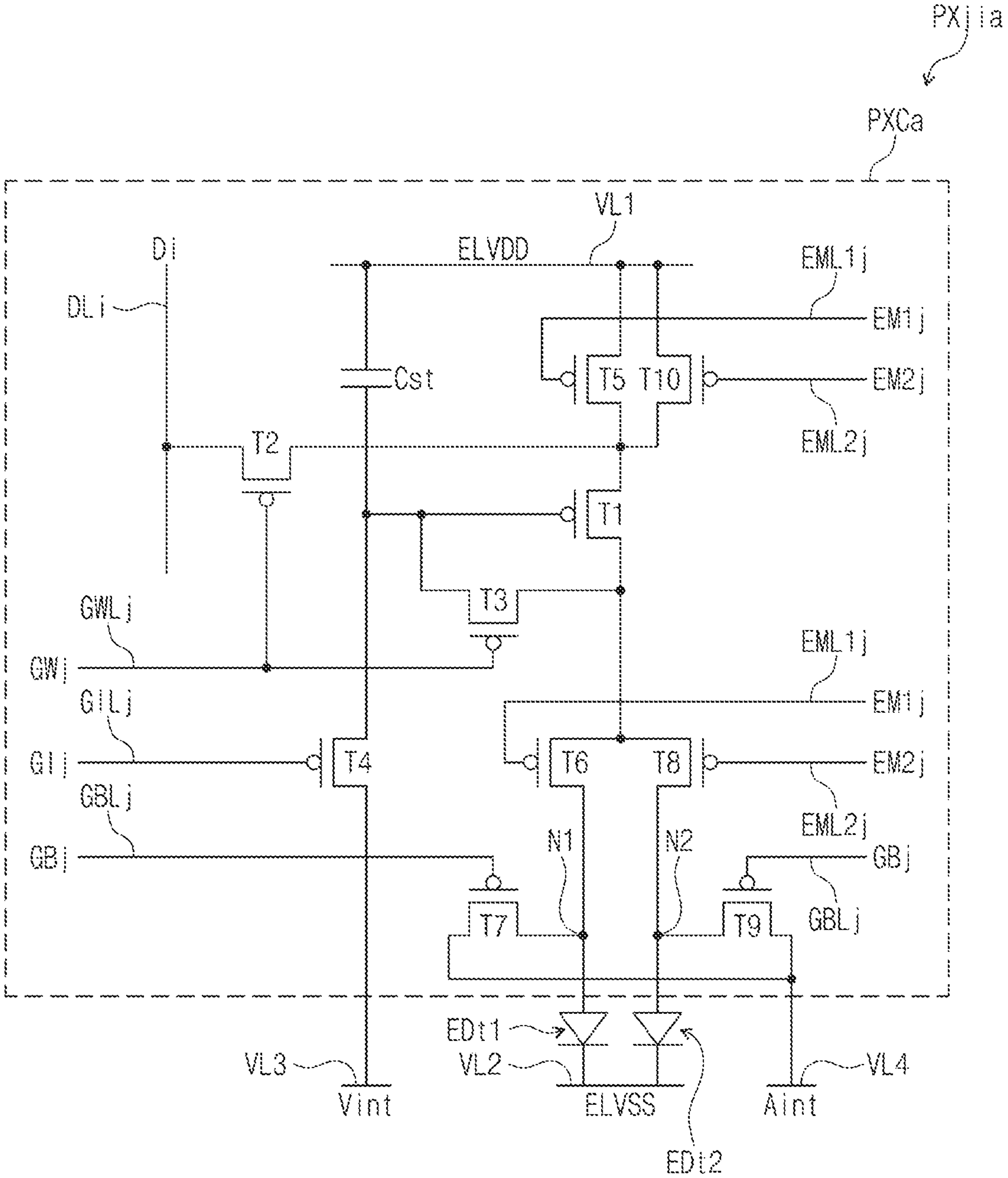
FIG. 16 is a circuit diagram of a pixel according to an embodiment of the invention.

FIG. 16 is a circuit diagram of a pixel PXjia according to an embodiment of the invention. In describing FIG. 16, the same or like reference numerals are used for the same or like components as those described in FIG. 14, and any repetitive detailed descriptions thereof will be omitted.

Referring to FIG. 16, the pixel PXjia may be connected to a j-th initialization scan line GILj, a j-th black scan line GBLj, a j-th write scan line GWLj, a j-th first light-emitting control line EML1*j*, a j-th second light-emitting control line EML2*j*, and an i-th data line DLi. Each of the plurality of pixels PX illustrated in FIG. 4 may have the same circuit configuration as the pixel PXjia illustrated in FIG. 16.

The pixel PXjia according to an embodiment of the invention may include a pixel driving circuit PXCa, a first-type light-emitting element EDt1, and a second-type light-emitting element EDt2. In an embodiment shown in FIG. 16, the pixel driving circuit PXCa may further include a tenth transistor T10.

The tenth transistor T10 may be connected between the first electrode of the first transistor T1 and the first driving voltage line VL1. The tenth transistor T10 includes a first electrode connected to the first driving voltage line VL1, a second electrode connected to the first electrode of the first transistor T1, and a gate electrode connected to the j-th second light-emitting control line EML2*j*. The tenth transistor T10 may be referred to as a fourth light-emitting control transistor.

According to an embodiment of the invention, the fifth transistor T5 and the sixth transistor T6 may be turned on in response to the first light-emitting control signal EM1*j* received through the j-th first light-emitting control line EML1*j*. In addition, the eighth transistor T8 and the tenth transistor T10 may be turned on in response to the second light-emitting control signal EM2*j* received through the j-th second light-emitting control line EML2*j*.

In an embodiment, for example, when the pixel driving circuit PXCa operates in the first mode MD1, as described above with reference to FIG. 15A, the eighth transistor T8 and the tenth transistor T10 may be activated in the first frame FR1 and the third frame FR3, and accordingly, the light emission of the second-type light-emitting element EDt2 may be controlled. The fifth transistor T5 and the sixth transistor T6 may be activated in the second frame FR2 and the fourth frame FR4, and accordingly, the light emission of the first-type light-emitting element EDt1 may be controlled.

In an embodiment, for example, when the pixel driving circuit PXCa operates in the first mode MD1*a*, as described above with reference to FIG. 15B, the fifth transistor T5 and the sixth transistor T6 may be activated in the plurality of frames FR1, FR2, FR3, and FR4 of the first mode MD1*a*, and accordingly, the light emission of the first-type light-emitting element EDt1 may be controlled. In an embodiment, for example, when the pixel driving circuit PXCa operates in the first mode MD1*b*, as described above with reference to FIG. 15C, the fifth transistor T5, the sixth transistor T6, the eighth transistor T8, and the tenth transistor T10 may be activated in the plurality of frames FR1, FR2, FR3, and FR4 of the first mode MD1*b*, and accordingly, the light emission of the first-type light-emitting element EDt1 and the second-type light-emitting element EDt2 may be controlled.

When the pixel driving circuit PXCa operates in the second mode MD2 as illustrated in FIGS. 15A, 15B, and 15C, the eighth transistor T8 and the tenth transistor T10 may be activated in the plurality of frames FR1*a*, FR2*a*, FR3*a*, and FR4*a*, and accordingly, the light emission of the second-type light-emitting element EDt2 may be controlled.

Figure 17:
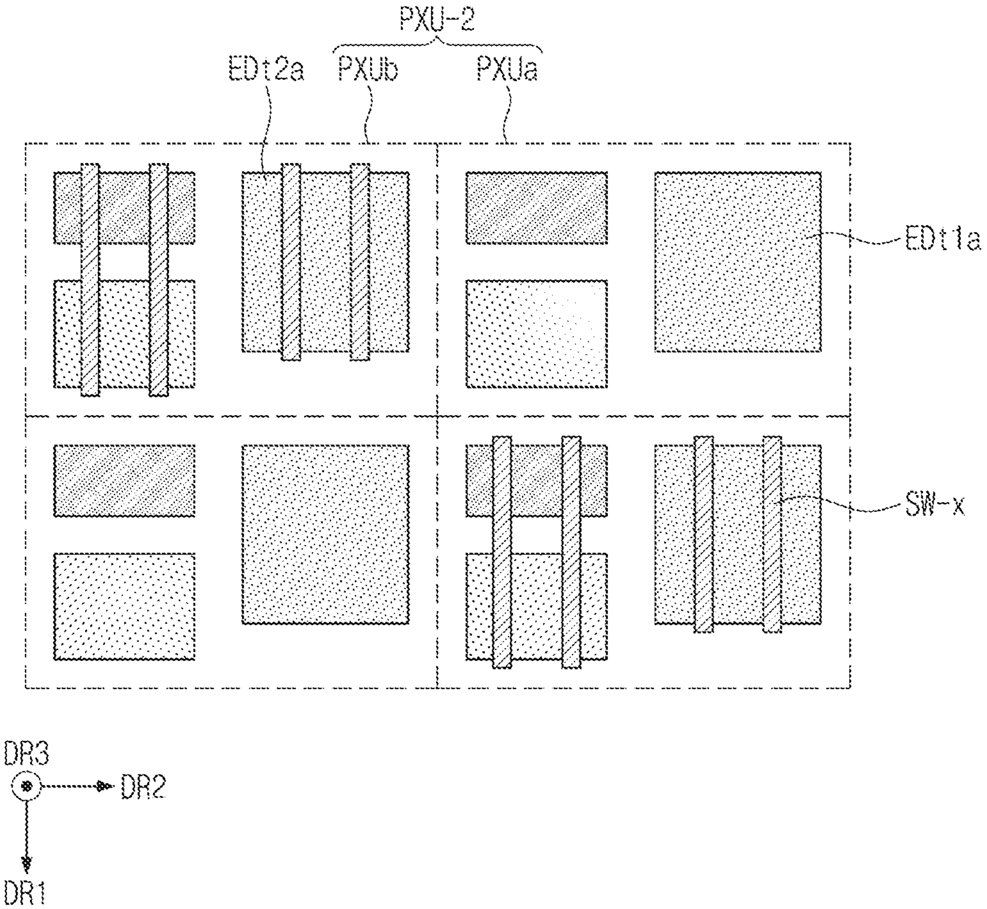
FIG. 17 is an enlarged plan view of a portion of a display device according to an embodiment of the invention.
Figure 18A:
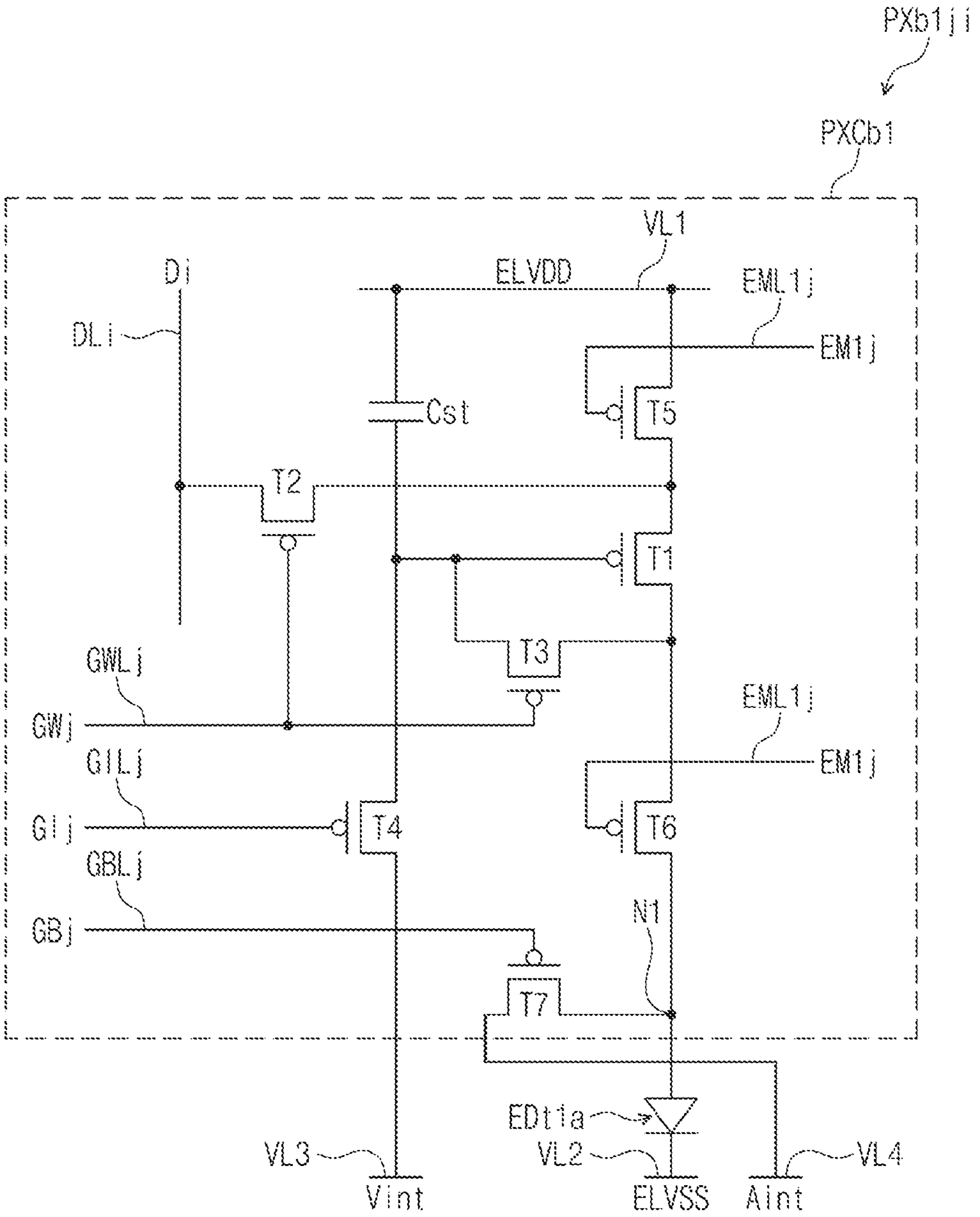
FIG. 18A is a circuit diagram of a first-type pixel according to an embodiment of the invention.
Figure 18B:
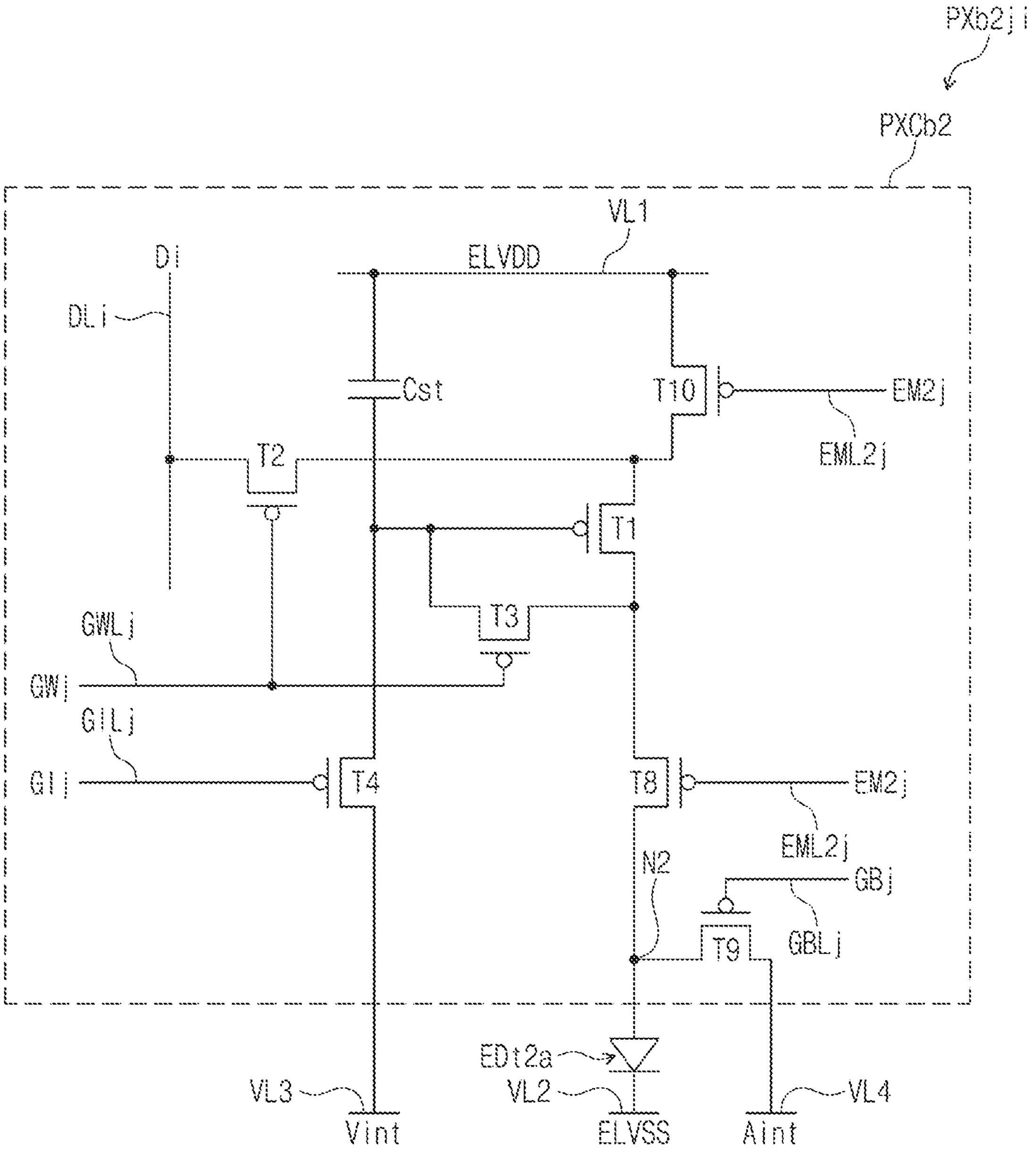
FIG. 18B is a circuit diagram of a second-type pixel according to an embodiment of the invention.

FIG. 17 is an enlarged plan view of a portion of a display device according to an embodiment of the invention. FIG. 18A is a circuit diagram of a first-type pixel according to an embodiment of the invention. FIG. 18B is a circuit diagram of a second-type pixel according to an embodiment of the invention.

Referring to FIGS. 17, 18A, and 18B, a plurality of repeated pixel units (or pixel unit group) PXU-2 may be repeatedly arranged along the first and second directions DR1 and DR2. FIG. 17 illustrates one repeated pixel unit PXU-2 for convenience of illustration. In an embodiment of the invention, the plurality of repeated pixel units PXU-2 may include a first pixel unit PXUa and a second pixel unit PXUb. In an embodiment, for example, the first pixel unit PXUa and the second pixel unit PXUb may be alternately and repeatedly arranged along the first direction DR1, and the first pixel unit PXUa and the second pixel unit PXUb may be alternately and repeatedly arranged along the second direction DR2.

The first pixel unit PXUa may include a plurality of first-type light-emitting elements EDt1*a*, and the second pixel unit PXUb may include a plurality of second-type light-emitting elements EDt2*a*. The second-type light-emitting element EDt2*a* overlaps barrier ribs SW-x. Accordingly, the viewing angle of light emitted from the second-type light-emitting element EDt2*a* may be limited by the barrier ribs SW-x.

FIG. 18A is a circuit diagram of one first-type pixel PXb1*ji* included in the first pixel unit PXUa, and FIG. 18B is a circuit diagram of one second-type pixel PXb2*ji* included in the second pixel unit PXUb.

The first-type pixel PXb1*ji* may include a pixel driving circuit PXCb1 and a first-type light-emitting element EDt1*a*. The pixel driving circuit PXCb1 may include first to seventh transistors T1, T2, T3, T4, T5, T6, and T7 and a capacitor Cst. The second-type pixel PXb2*ji* may include a pixel driving circuit PXCb2 and a second-type light-emitting element EDt2*a*. The pixel driving circuit PXCb2 may include first, second, third, fourth, eighth, ninth, and tenth transistors T1, T2, T3, T4, T8, T9, and T10 and a capacitor Cst.

The fifth transistor T5 and the sixth transistor T6 of the first-type pixel PXb1*ji* may be turned on in response to the first light-emitting control signal EMU received through the j-th first light-emitting control line EML1*j*. The eighth transistor T8 and the tenth transistor T10 of the second-type pixel PXb2*ji* may be turned on in response to the second light-emitting control signal EM2*j* received through the j-th second light-emitting control line EML2*j*.

In an embodiment of the invention, when the display panel DPL (see FIG. 4) operates in the first mode, the first pixel unit PXUa and the second pixel unit PXUb may be driven in a time-division manner, or only the first pixel unit PXUa may be driven, or the first pixel unit PXUa and the second pixel unit PXUb may be driven simultaneously. In addition, when the display panel DPL (see FIG. 4) operates in the second mode, only the second pixel unit PXUb may be driven. In an embodiment illustrated in FIG. 17, the resolution may be changed according to the driving mode. In an embodiment, for example, a first resolution may be the highest when the first pixel unit PXUa and the second pixel unit PXUb are simultaneously driven in the first mode, and a second resolution may be half of the first resolution when only the second pixel unit PXUb is driven in the second mode.

In an embodiment, as described above, the display device may selectively operate in one of a first mode for displaying an image on a screen with a first viewing angle and a second mode for displaying an image on a screen with a second viewing angle narrower than the first viewing angle. In an embodiment, for example, according to a user's selection or a predetermined regulation, the display device may operate in the second mode in which a viewing angle is controlled.

One pixel may include a pixel driving circuit and a first-type light-emitting element and a second-type light-emitting element which are controlled by the pixel driving circuit. Accordingly, each of the resolution of the display device at the time of operating in the first mode and the resolution of the display device at the time of operating in the second mode may be the same as the original resolution of the display device. Accordingly, the display device DD may provide an image without deterioration of resolution even when converted into the other mode having a different viewing angle.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:

a pixel driving circuit;

a first-type light-emitting element electrically connected to the pixel driving circuit;

a second-type light-emitting element electrically connected to the pixel driving circuit; and a light path control layer disposed to overlap the second-type light-emitting element, wherein the light path control layer controls a path of light provided from the second-type light-emitting element, wherein the light path control layer comprises a plurality of barrier ribs and a transmission portion between the plurality of barrier ribs, and wherein each of the plurality of barrier ribs comprises a multi-layered film including a low-reflection layer having a reflectance of less than about 10 percent.

2. The display device of claim 1, wherein a color of light provided from the first-type light-emitting element is substantially the same as a color of light provided from the second-type light-emitting element.

3. The display device of claim 1, further comprising:

a data line, a plurality of scan lines, a plurality of light-emitting control lines, and a plurality of voltage lines, which are electrically connected to the pixel driving circuit, wherein the pixel driving circuit comprises:

a driving transistor comprising a first electrode, a second electrode, and a gate electrode;

a switching transistor connected between the first electrode of the driving transistor and the data line;

a first light-emitting control transistor connected between the second electrode of the driving transistor and the first-type light-emitting element; and a second light-emitting control transistor connected between the second electrode of the driving transistor and the second-type light-emitting element.

4. The display device of claim 3, wherein:

the plurality of voltage lines comprises an initialization voltage line to which an initialization voltage is applied; and the pixel driving circuit further comprises:

a first initialization transistor connected between the initialization voltage line and a first node between the first light-emitting control transistor and the first-type light-emitting element; and a second initialization transistor connected between the initialization voltage line and a second node between the second light-emitting control transistor and the second-type light-emitting element.

5. The display device of claim 3, wherein:

the plurality of voltage lines comprises a first driving voltage line to which a first driving voltage is applied and a second driving voltage line to which a second driving voltage different from the first driving voltage is applied;

the first-type light-emitting element and the second-type light-emitting element are connected to the second driving voltage line; and the pixel driving circuit further comprises a third light-emitting control transistor connected between the first driving voltage line and the first electrode of the driving transistor.

6. The display device of claim 5, wherein the plurality of light-emitting control lines comprises:

a first light-emitting control line connected to a gate electrode of the first light-emitting control transistor;

a second light-emitting control line connected to a gate electrode of the second light-emitting control transistor, wherein a signal applied to the second light-emitting control line is different from a signal applied to the first light-emitting control line; and a third light-emitting control line connected to a gate electrode of the third light-emitting control transistor, wherein a signal applied to the third light-emitting control line is different from both the signal applied to the first light-emitting control line and the signal applied to the second light-emitting control line.

7. The display device of claim 5, wherein the pixel driving circuit further comprises a fourth light-emitting control transistor connected between the first driving voltage line and the first electrode of the driving transistor.

8. The display device of claim 7, wherein the plurality of light-emitting control lines comprise:

a first light-emitting control line connected to a gate electrode of the first light-emitting control transistor and a gate electrode of the third light-emitting control transistor; and a second light-emitting control line connected to a gate electrode of the second light-emitting control transistor and a gate electrode of the fourth light-emitting control transistor, wherein a signal applied to the second light-emitting control line is different from a signal applied to the first light-emitting control line.

9. The display device of claim 1, wherein the pixel driving circuit selectively operates in one of a first mode and a second mode, wherein, in the second mode, the first-type light-emitting element does not emit light, and the second-type light-emitting element emits light.

10. The display device of claim 9, wherein, in the first mode, the first-type light-emitting element and the second-type light-emitting element alternately emit light in a time-division manner.

11. The display device of claim 9, wherein, in the first mode, the second-type light-emitting element does not emit light, and the first-type light-emitting element emits light.

12. The display device of claim 9, wherein, in the first mode, the first-type light-emitting element and the second-type light-emitting element simultaneously emit light.

13. The display device of claim 1, wherein:

a first light-emitting region is defined in the first-type light-emitting element;

a second light-emitting region is defined in the second-type light-emitting element; and the plurality of barrier ribs overlaps the second light-emitting region.

14. The display device of claim 13, wherein the light path control layer is provided in plural, wherein a plurality of light path control layers is sequentially stacked in a direction away from the first-type light-emitting element and second-type light-emitting element.

15. The display device of claim 13, wherein each of the plurality of barrier ribs extends in a first direction, and a width of the second light-emitting region in the first direction is less than a length of each of the plurality of barrier ribs in the first direction.

16. An electronic device comprising:

a display panel comprising a plurality of pixel units; and a light path control layer disposed on the display panel and comprising a plurality of barrier ribs which controls a path of light provided from the display panel, wherein each of the plurality of pixel units comprises:

X light-emitting elements, wherein X is a positive integer; and

Y pixel driving circuits which drive the X light-emitting elements, wherein Y is a positive integer less than X, wherein the X light-emitting elements comprise:

a plurality of first-type light-emitting elements not overlapping the plurality of barrier ribs; and a plurality of second-type light-emitting elements overlapping the plurality of barrier ribs.

17. The electronic device of claim 16, wherein:

the plurality of first-type light-emitting elements comprises a first first-type light-emitting element, a second first-type light-emitting element, and a third first-type light-emitting element; and the plurality of second-type light-emitting elements comprises a first second-type light-emitting element, a second second-type light-emitting element, and a third second-type light-emitting element, wherein:

a color of light provided from the first first-type light-emitting element is substantially the same as a color of light provided from the first second-type light-emitting element;

a color of light provided from the second first-type light-emitting element is substantially the same as a color of light provided from the second second-type light-emitting element; and a color of light provided from the third first-type light-emitting element is substantially the same as a color of light provided from the third second-type light-emitting element.

18. The electronic display device of claim 17, wherein:

the plurality of pixel units is repeatedly arranged along a first direction and a second direction crossing the first direction;

the first second-type light-emitting element, the first first-type light-emitting element, the second second-type light-emitting element, and the second first-type light-emitting element are arranged along the first direction; and the third second-type light-emitting element and the third first-type light-emitting element are arranged along the first direction, wherein the third second-type light-emitting element and the third first-type light-emitting element are spaced apart from the first second-type light-emitting element, the first first-type light-emitting element, the second second-type light-emitting element, and the second first-type light-emitting element in the second direction.

19. The electronic device of claim 17, wherein:

the plurality of pixel units is repeatedly arranged along a first direction and a second direction crossing the first direction;

the first first-type light-emitting element and the first second-type light-emitting element are arranged to be spaced apart from each other in the second direction;

the second first-type light-emitting element and the second second-type light-emitting element are arranged to be spaced apart from each other in the second direction;

the third first-type light-emitting element and the third second-type light-emitting element are arranged to be spaced apart from each other in the second direction;

the first first-type light-emitting element is arranged to be spaced apart from the second first-type light-emitting element in the first direction; and the first second-type light-emitting element is arranged to be spaced apart from the second second-type light-emitting element in the first direction.

20. The electronic device of claim 19, wherein the plurality of barrier ribs comprise a barrier rib extending in the first direction and overlapping both the first second-type light-emitting element and the second second-type light-emitting element.

21. The electronic device of claim 19, wherein the plurality of barrier ribs comprise:

a first barrier rib extending in the first direction and overlapping the first second-type light-emitting element; and a second barrier rib extending in the first direction, spaced apart from the first barrier rib, and overlapping the second second-type light-emitting element.

22. The electronic device of claim 16, wherein X is twice Y.

* * * * *